US012793374B2

(12) United States Patent
Roheda et al.

(10) Patent No.: US 12,793,374 B2
(45) Date of Patent: Nov. 10, 2026

(54) METHOD AND ELECTRONIC DEVICE FOR DETECTING BLUR IN IMAGE

(71) Applicant: SAMSUNG ELECTRONICS CO., LTD., Suwon-si (KR)

(72) Inventors: Siddharth Deepak Roheda, Bangalore (IN); Amit Satish Unde, Bangalore (IN); Alok Shankarlal Shukla, Bangalore (IN); Rishikesh Jha, Bangalore (IN); Soohyeong Lee, Suwon-si (KR); Shashavali Doodekula, Bangalore (IN); Sai Kumar Reddy Manne, Bangalore (IN); Saikat Kumar Das, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 18/911,012

(22) Filed: Oct. 9, 2024

(65) Prior Publication Data

US 2025/0037248 A1 Jan. 30, 2025

Related U.S. Application Data

(63) Continuation of application No. PCT/KR2023/004796, filed on Apr. 10, 2023.

(30) Foreign Application Priority Data

Apr. 9, 2022 (IN) ............................. 202141057324
Apr. 4, 2023 (IN) ............................. 202141057324

(51) Int. Cl.
*G06T 5/73* (2024.01)
*G06V 10/25* (2022.01)

(52) U.S. Cl.
CPC ................ *G06V 10/25* (2022.01); *G06T 5/73* (2024.01)

(58) Field of Classification Search
CPC ...... G06V 10/25; G06V 10/82; G06V 10/764; G06V 40/172; G06T 5/73
See application file for complete search history.

(56) References Cited

U.S. PATENT DOCUMENTS 7,257,273 B2 8/2007 Li et al.
7,619,656 B2 11/2009 Ben-Ezra et al.
(Continued)

FOREIGN PATENT DOCUMENTS

CN 111563513 A 8/2020
EP 2 469 837 B1 9/2016
WO 2021/045599 A1 3/2021

OTHER PUBLICATIONS

Communication issued Oct. 9, 2024 by the Intellectual Property Office of India in Indian Patent Application No. 202141057324.
(Continued)

*Primary Examiner* — Lixi C Simpson
(74) *Attorney, Agent, or Firm* — Sughrue Mion, PLLC

(57) ABSTRACT

A method of detecting blur in an input image, the method including: detecting one or more candidate blur regions of a plurality of regions in the input image; determining, a first confidence score of the one or more candidate blur regions in the input image; determining a second confidence score of a global blur in the input image; determining a third confidence score of an intentional blur in the input image; and detecting a type of blur and a strength of the type of blur in the input image based on the first confidence score of the one or more candidate blur regions, the second confidence score of the global blur, and the third confidence score of the intentional blur.

15 Claims, 31 Drawing Sheets

(56) References Cited

U.S. PATENT DOCUMENTS

| | | | | |
|---|---|---|---|---|
| 10,755,173 | B2 | 8/2020 | Wang et al. | |
| 10,764,499 | B2 | 9/2020 | Thumpudi | |
| 10,878,550 | B2 | 12/2020 | Shen et al. | |
| 11,017,511 | B2 | 5/2021 | Lukac et al. | |
| 11,836,898 | B2 | 12/2023 | He et al. | |
| 11,914,677 | B2 | 2/2024 | Chen | |
| 2013/0129233 | A1* | 5/2013 | Schiller | G06V 10/147 382/228 |
| 2014/0003734 | A1 | 1/2014 | Umansky et al. | |
| 2017/0357871 | A1* | 12/2017 | Zhai | G06F 18/214 |
| 2018/0096449 | A1 | 4/2018 | Racz et al. | |
| 2019/0197362 | A1 | 6/2019 | Campanella et al. | |
| 2019/0362199 | A1* | 11/2019 | Lin | G06F 18/24 |
| 2021/0142041 | A1 | 5/2021 | Lee et al. | |
| 2021/0319340 | A1 | 10/2021 | Shabtay et al. | |
| 2022/0270215 | A1 | 8/2022 | Lee | |
| 2022/0284236 | A1* | 9/2022 | Misraa | G06F 18/214 |

OTHER PUBLICATIONS

Extended European Search Report dated May 12, 2025, issued by the European Patent Office in European Application No. 23785057.3.

Huang et al., "Image Blur Classification and Unintentional Blur Removal", IEEE Access, 2019, DOI: 10.1109/ACCESS.2019.2932124, vol. 7, pp. 106327-106335 (9 pages total).

Fan et al., "Image Blur Classification and Blur Usefulness Assessment", Proceedings of the IEEE International Conference on Multimedia and Expo Workshops (ICMEVV) 2017, pp. 531-536 (6 pages total).

Huang et al., "Image Blur Classification and Unintentional Blur Removal", IEEE Access, Jul. 30, 2019, pp. 106327-106335, vol. 7, DOI:10.1109/ACCESS.2019.2932124.

Zeng et al., "A Local Metric for Defocus Blur Detection Based on CNN Feature Learning", IEEE Transactions on Image Processing, May 2019, pp. 2107-2115, vol. 28.

International Search Report and Written Opinion (PCT/ISA/210 and PCT/ISA/237) dated Jul. 12, 2023, issued by International Searching Authority for International Application No. PCT/KR2023/004796.

* cited by examiner

METHOD AND ELECTRONIC DEVICE FOR DETECTING BLUR IN IMAGE

CROSS-REFERENCE TO RELATED APPLICATIONS

This application is a continuation of PCT International Application No. PCT/KR2023/004796, which was filed on Apr. 10, 2023, and claims priority to Indian patent application No. 202141057324, filed on Apr. 4, 2023, and claims priority to Indian patent application No. 202141057324, filed on Apr. 9, 2022, the disclosures of each of which are incorporated by reference herein their entirety.

BACKGROUND

1. Field

The present disclosure relates to image processing, and more specifically to a method and electronic device for detecting blur in an image.

2. Description of Related Art

Recently, image enhancement has gained widespread attention, especially in consumer markets including, but not limited to, smartphones. Leading smartphone vendors have made exceptional progress in image enhancement in areas including, but not limited to, a High Dynamic Range (HDR). However, one of the most common artifacts seen in images is blur, resulting in de-blurring becoming a very critical enhancement method.

As shown in the FIGS. 1A-1D, blur in images are caused due to subject in motion, camera in motion, auto-focus failure and intentional lens or bokeh blur. The conventional methods and systems can de-blur the blur in the images, however the conventional methods are not able to differentiate the blur that is intentionally introduced by a user (FIG. 1D), the blur caused by the subject in motion (FIG. 1A), the camera in motion (FIG. 1B) and the auto-focus failure (FIG. 1C). Thus performing de-blur in the blur image (FIG. 1D) where the blur is intentionally introduced by the user degrades the quality of the image.

SUMMARY

The principal object of the embodiments herein is to provide a method and electronic device for detecting blur in an input image. The method includes detecting at least a type of blur and a strength of the type of blur in the input image. When the type of blur is detected as intentional blur, then the electronic device does not perform de-blurring operations.

Another object of the embodiments herein is to measure a plurality of entropies of a plurality of regions in the input image and classify a first set of regions of the plurality of regions with entropies lower than a first threshold as sharp, a second set of regions of the plurality of regions with entropies higher than a second threshold as blur, and a third set of regions of the plurality of regions with entropies higher than the first threshold and lower than the second threshold as a candidate blur regions.

Yet another object of the embodiments herein is fuse a global blur probability, local blur probability, and intentional blur probability in the input image to generate a determination on correcting global blur and/or local blur.

According to an aspect of the disclosure, a method of detecting blur in an input image, the method performed by at least one processor of an electronic device, the method comprising: detecting, by the electronic device performing a pixel analysis on the input image, one or more candidate blur regions of a plurality of regions in the input image; determining, by the electronic device, a first confidence score of the one or more candidate blur regions in the input image; determining, by the electronic device, a second confidence score of a global blur in the input image; determining, by the electronic device, a third confidence score of an intentional blur in the input image; and detecting, by the electronic device, a type of blur and a strength of the type of blur in the input image based on the first confidence score of the one or more candidate blur regions, the second confidence score of the global blur, and the third confidence score of the intentional blur.

According to an aspect of the disclosure, the detecting, by the electronic device, the one or more candidate blur regions in the input image, comprises: measuring, by the electronic device, a plurality of entropies of the plurality of regions in the input image; and classifying, by the electronic device, a first set of regions of the plurality of regions with entropies lower than a first threshold as sharp, a second set of regions of the plurality of regions with entropies higher than a second threshold as blur, and a third set of regions of the plurality of regions with entropies higher than the first threshold and lower than the second threshold as the one or more candidate blur regions, wherein the second threshold is higher than the first threshold.

According to an aspect of the disclosure, the determining, by the electronic device, the third confidence score of the intentional blur in the input image, comprises: measuring, by the electronic device, a plurality of entropies of the plurality of regions in the input image; and determining, by the electronic device, the third confidence score of the intentional blur to be categorized as a high level based on a determination that (i) a value of each entropy from the plurality of entropies is lower than an entropy threshold towards a center of the input image and the value of each entropy from the plurality of entropies is higher than the entropy threshold towards edges of the input image.

According to an aspect of the disclosure, the determining, by the electronic device, the first confidence score of the one or more candidate blur regions in the input image, comprises: generating, by the electronic device, a segmented image indicating the one or more candidate blur regions by fusing a candidate blur region mask with the input image, wherein the candidate blur region mask indicates a plurality of entropies of the plurality of regions in the input image; and determining, by the electronic device, the first confidence score of each of the one or more candidate blur regions in the segmented image.

According to an aspect of the disclosure the determining, by the electronic device, the second confidence score of the global blur in the input image, comprises: analyzing, by the electronic device, an entirety of the input image; and determining, by the electronic device, the second confidence score of the global blur in the input image based on a level of intensity of the global blur in the input image.

According to an aspect of the disclosure, the detecting, by the electronic device, the type of blur and the strength of the type of blur in the input image using the first confidence score of the one or more candidate blur regions, the second confidence score of the global blur, and the third confidence score of the intentional blur, comprises: determining, by the electronic device, a first weight for the first confidence score of the one or more candidate blur regions based on a percentage of pixels associated with the one or more candidate blur regions, a second weight for the second confidence score of the global blur based on a percentage of pixels associated with global blur regions, and a third weight for the third confidence score of the intentional blur based on a percentage of pixels associated with intentional blur regions; and detecting the type of blur and the strength of the type of blur in the input image using the first weight, the second weight, the third weight, the first confidence score of the one or more candidate blur regions, the second confidence score of the global blur, and the third confidence score of the intentional blur.

According to an aspect of the disclosure, further comprising: determining, by the electronic device, that the type of blur and the strength of the type of blur is greater than or equal to a blur threshold; and performing, by the electronic device, at least one of: displaying a recommendation on the electronic device, wherein the recommendation is related to at least one of deletion of the input image, an enhancement of the input image, de-blurring the input image, and recapturing the input image, and generating a tag comprising an image quality parameter comprising at least one of the type of blur and the strength of the type of blur, and storing the tag associated with the input image in a media database.

According to an aspect of the disclosure, a blur correction management method for an input image, the method performed by at least on processor of an electronic device, the method comprising: detecting, by the electronic device by performing a pixel analysis on the input image, a global blur in the input image for which blur correction is required; estimating, by the electronic device, a global blur probability as a measure of a first confidence level associated with the global blur; detecting, by the electronic device, one or more local regions having candidate blur in the input image; measuring, by the electronic device, one or more entropies in the detected one or more local regions having the candidate blur; selecting, by the electronic device based on the one or more entropies, one or more regions of the one or more local regions having a pre-defined entropy range for local blur correction; estimating, by the electronic device, a local blur probability as a measure of a second confidence level associated with the local blur; detecting, by the electronic device based on the one or more entropies, one or more sharp regions comprising a pre-defined entropy range; estimating, by the electronic device, an intentional blur probability as a measure of a third confidence level associated with a blur intentionally introduced; and fusing, by the electronic device, the global blur probability, the local blur probability, and the intentional blur probability to generate a determination on correcting the global blur and/or the local blur.

According to an aspect of the disclosure, an electronic device for of detecting blur in an input image, the electronic device comprising: a memory storing one or more instructions; and a processor operatively coupled to the memory wherein the one or more instructions, when executed by the processor, cause the electronic device to: detect, by the electronic device performing a pixel analysis on the input image, one or more candidate blur regions of a plurality of regions in the input image, determine a first confidence score of the one or more candidate blur regions in the input image, determine a second confidence score of a global blur in the input image, determine a third confidence score of an intentional blur in the input image, and detect a type of blur and a strength of the type of blur in the input image based on the first confidence score of the one or more candidate blur regions, the second confidence score of the global blur, and the third confidence score of the intentional blur.

According to an aspect of the disclosure, the one or more instructions, when executed by the processor, further cause the electronic device, to detect the one or more candidate blur regions in the input image, to: measure a plurality of entropies of the plurality of regions in the input image, classify a first set of regions of the plurality of regions with entropies lower than a first threshold as sharp, a second set of regions of the plurality of regions with entropies higher than a second threshold as blur, and a third set of regions of the plurality of regions with entropies higher than the first threshold and lower than the second threshold as the one or more candidate blur regions, and wherein the second threshold is higher than the first threshold.

According to an aspect of the disclosure, the one or more instructions, when executed by the processor, further cause the electronic device, to determine the third confidence score of the intentional blur in the input image, to: measure a plurality of entropies of the plurality of regions in the input image; and determine the third confidence score of the intentional blur to be categorized as a high level based on a determination that (i) a value of each entropy from the plurality of entropies is lower than an entropy threshold towards a center of the input image and the value of each entropy from the plurality of entropies is higher than the entropy threshold towards edges of the input image.

According to an aspect of the disclosure, the one or more instructions, when executed by the processor, further cause the electronic device, to determine the first confidence score of the one or more candidate blur regions in the input image, to: generate a segmented image indicating the one or more candidate blur regions by fusing a candidate blur region mask with the input image, wherein the candidate blur region mask indicates a plurality of entropies of the plurality of regions in the input image; and determine the first confidence score of each of the one or more candidate blur regions in the segmented image.

According to an aspect of the disclosure, the one or more instructions, when executed by the processor, further cause the electronic device, to determine the second confidence score of the global blur in the input image, to: analyze an entirety of the input image; and determine the second confidence score of the global blur in the input image based on a level of intensity of the global blur in the input image.

According to an aspect of the disclosure, the one or more instructions, when executed by the processor, further cause the electronic device, to detect the type of blur and the strength of the type of blur in the input image using the first confidence score of the one or more candidate blur regions, the second confidence score of the global blur, and the third confidence score of the intentional blur, to: determine a first weight for the first confidence score of the one or more candidate blur regions based on a percentage of pixels associated with the one or more candidate blur regions, a second weight for the second confidence score of the global blur based on a percentage of pixels associated with global blur regions, and a third weight for the third confidence score of the intentional blur based on a percentage of pixels associated with intentional blur regions, and detect the type of blur and the strength of the type of blur in the input image using the first weight, the second weight, the third weight, the first confidence score of the one or more candidate blur regions, the second confidence score of the global blur, and the third confidence score of the intentional blur.

According to an aspect of the disclosure, the one or more instructions, when executed by the processor, further cause the electronic device, to: determine that the type of blur and the strength of the type of blur is greater than or equal to a blur threshold, and perform at least one of: display a recommendation on the electronic device, wherein the recommendation is related to at least one of deletion of the input image, an enhancement of the input image, de-blurring the input image, and recapturing the input image, and generate a tag comprising an image quality parameter comprising at least one of the type of blur and the strength of the type of blur, and storing the tag associated with the input image in a media database.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF DRAWING

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
FIG. 1A (Related Art)
FIG. 1A-1D are photographic images illustrating a blur due to subject in motion, the camera in motion, the auto-focus failure, and intentional, respectively.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method of detecting blur in an input image. The method includes detecting, by an electronic device, one or more candidate blur regions of a plurality of regions in an input image. The method includes determining, by the electronic device, a confidence score of the one or more candidate blur regions in the input image. Further, the method includes determining, by the electronic device, a confidence score of a global blur in the input image. Further, the method includes determining, by the electronic device, a confidence score of an intentional blur in the input image. Further, the method includes detecting, by the electronic device, at least a type of blur and a strength of the type of blur in the input image based on the confidence score of the one or more candidate blur regions, the confidence score of the global blur, and the confidence score of the intentional blur.

Accordingly, the embodiment herein is to provide a method of detecting, by the electronic device, the global blur in the input image for which blur correction is required. Further, the method includes estimating, by the electronic device, a global blur probability as a measure of a confidence level in the presence of the global blur. Further, the method includes detecting, by the electronic device, one or more local regions having candidate blur in the image. Further, the method includes measuring, by the electronic device, entropies in the detected one or more local regions. Further, the method includes selecting, by the electronic device, the one or more local regions having pre-defined entropy range for local blur correction. Further, the method includes estimating, by the electronic device, a local blur probability as a measure of a confidence level in the presence of the local blur. Further, the method includes detecting, by the electronic device, one or more sharp regions having pre-defined entropy range. Further, the method includes estimating, by the electronic device, an intentional blur probability as a measure of a confidence level in presence of blur introduced by a user intentionally. Further, the method includes fusing, by the electronic device, the global blur probability, local blur probability, and intentional blur probability to generate a determination on correcting the global blur and/or the local blur.

Accordingly, the embodiments herein provide the electronic device for of detecting blur in the input image, comprises: a memory; a processor coupled to the memory; and a blur detector coupled to the memory and the processor. The blur is detector configured to detect one or more candidate blur regions of the plurality of regions in the input image. The blur detector is configured to determine the confidence score of the one or more candidate blur regions in the input image. The blur detector is configured to determine the confidence score of the global blur in the input image. The blur detector is configured to determine the confidence score of the intentional blur in the input image. The blur detector is configured to detect at least the type of blur and the strength of the type of blur in the input image based on the confidence score of the one or more candidate blur regions, the confidence score of the global blur, and the confidence score of the intentional blur.

Accordingly, the embodiments herein provide the electronic device for blur correction management of the input image, comprises: the memory; the processor coupled to the memory; and the blur detector coupled to the memory and the processor. The blur detector is configured to detect the global blur in the input image for which blur correction is required. The blur detector is further configured to estimate the global blur probability as the measure of the confidence level in the presence of the global blur. The blur detector is further configured to detect one or more local regions having candidate blur in the image. The blur detector is further configured to measure entropies in the detected one or more local regions. The blur detector is further configured to select the one or more local regions having pre-defined entropy range for local blur correction. The blur detector is further configured to estimate the local blur probability as the measure of the confidence level in the presence of the local blur. The blur detector is further configured to detect one or more sharp regions having pre-defined entropy range. The blur detector is further configured to estimate the intentional blur probability as the measure of the confidence level in presence of blur introduced by the user intentionally. The blur detector is further configured to fuse the global blur probability, local blur probability, and intentional blur probability to generate the determination on correcting the global blur and/or the local blur.

Generally, advances in mobile camera sensors have enabled development of image enhancement applications including, but not limited to a de-blur process, a de-noise process, and a sharpening process. Despite remarkable progress in mobile camera technology, blur and noise remain the most important factors that degrade a perceptual quality of the input image. While a global motion blur is generally due to camera shake during capture and by relative motion between the camera and objects, defocus or local blur occurs due to a wide aperture and incorrect focus settings. Blur in images deteriorate the quality of the input image significantly and leads to loss of detailed information. Therefore, blur detection is crucial for identifying blurry images and triggering a deblur engine in order to enrich the user experience by seamlessly providing high quality sharp images.

In one or more examples, the blur and the noise are intrinsically related to denoising, that eliminates fine structures along with unwanted details, while a blur removal restores structures and fine details. This interconnectedness between features of an image makes the development of image enhancement algorithms extremely challenging. Therefore, the quality of enhanced images is crucially dependent on the order in which enhancement engines are applied. In this aspect, blur detection probability plays a critical role to determine the order of enhancement engines that need to be triggered to achieve the best quality restoration. In one or more examples, the blur detection probability is a value indicating a likelihood that a region of an image is blurred. Thus, in one or more examples, the proposed method and electronic device uses an automatic blur detection methodology along with an associated probability. Unlike the conventional methods and systems, the proposed method and electronic device advantageously performs blur detection in the input image through efficient fusion of local and global blur properties. Unlike the conventional methods and systems, the proposed method and electronic device segments or localizes motion candidates in the input image that may contribute towards blur in the input image.

Currently, users are facing issues including but, not limited to blur in images significantly deteriorating the perceptual quality of images, difficulty to read scanned blurry documents, challenging in developing a blur extent-agnostic de-blur engine and struggling to determine an order of enhancement engine to be applied to get a best quality enhanced images.

The conventional methods and systems include, but not limited to, Multi-Frame Noise Reduction (MFNR) and High Dynamic Range (HDR) imaging techniques performs image enhancement. The conventional methods and systems use a photometric difference to generate a motion map that shows a degree of motion incurred for each pixel to determine the blur in the images. However, the conventional method needs multiple frames to generate the motion map, and does not work for a single image.

In other conventional methods and systems, the images are first converted to an edge map by convolving it with an edge filter, for example, sobel, laplace and the like. The variance of the edge map is used to determine the extent of blur in images, where high variance denotes a sharp image and low variance denotes a blurry image. However, the conventional method cannot differentiate intentional blur from artifacts. Furthermore, the conventional method also cannot detect local blur as the conventional method considers only a holistic view of the image. For example, the conventional method considers a whole image, or a whole set of images, rather than considering individual regions of an image.

In other conventional methods and systems, the images are first converted to a frequency domain, for example wavelet, Fourier and the like. In these methods, the low frequency regions are classified as blur. However, the conventional method, by converting an image to the frequency domain, cannot identify intentional blur in the images.

Unlike the conventional methods and systems, the embodiments of the present disclosure automatically detect images from a gallery that have the blur artifact, which has been created unintentionally and passes them to a de-blur enhancement engine for removing the blur.

Unlike the conventional methods and systems, the embodiments of the present disclosure automatically detect bokeh blur in images and the images clicked in portrait mode. In one or more examples, a bokeh blur process is a process that identifies a main object, and applies varying degrees of blur to the background based on distance from the main object.

Unlike the conventional methods and systems, the embodiments of the present disclosure identify blurry images and recognize intentional blur introduced by users by localizing candidate blur regions.

The other conventional methods and systems, uses frequency transforms or wavelet transform to perform detection of the blur in frequency domain. However frequency transforms are difficult to implement in mobile devices. Unlike the conventional methods and systems, the proposed method and electronic device performs detection of the blur in a Red, Green, and Blue (RGB)/a Luma (YUV)/Hue Saturation Value (HSV)/other colour domain. Therefore, the proposed method and electronic device advantageously eliminates the need for frequency transforms. Further, the proposed method and electronic device does not localize the 'attention areas' to be checked for the blur, as a result images or videos with bokeh effect in background gets classified as blurry.

The other conventional methods and systems perform detection of defocus blur only. Unlike the conventional methods and systems, the embodiments of the present disclosure detect motion blur as well.

The other conventional methods and systems, involves generation of local sharpness map from the input image which marks sharp areas in the input image using edge filters. However the conventional methods and systems does not refine this sharpness map or use any global information that leads to misclassifications in cases of bokeh/defocus blur.

The other conventional methods and systems rely on temporal information to determine global/local motions and it cannot be directly extended to a single frame blur detection. Unlike the conventional methods and systems, the embodiments of the present disclosure focus on local blur candidates and only require a single frame information to determine blurry or non-blurry regions.

The other conventional methods and systems, use regression to estimate a blur or non-blur mask from the input image, it requires pixel-wise labeled ground truth images to train the network. The conventional method is extended to detect motion and defocus blur, however the conventional method does not include global and local blur detection.

The other conventional methods and systems suggest no methodology for detecting blurry frames. Therefore, the conventions methods and systems are applied on frames where no de-blurring required, leading to unwanted artifacts. Unlike the conventional methods and systems, the embodiments of the present disclosure detect blur images or videos and accurately detect both global blur due to the camera panning and defocus as well as local blur due to motion of local components. The embodiments of the present disclosure detect regions in the input image that require de-blurring. Therefore, the embodiments of the present disclosure do not erroneously de-blur intentional blurring by the user. The examples of intentional blurring includes, but not limited to, artistic bokeh blur, lens blur.

The other conventional methods and systems determine the blur score based on the edges in the images. The width of edges in the image is determined and a threshold is used to classify the image as sharp or blurry. The threshold is difficult to determine and varies for different capture devices. Unlike the conventional methods and systems, the embodiments of the present disclosure use a neural network to refine motion candidates and does not require tuning for different capture devices.

The other conventional methods and systems use a frequency transformation which is slow on a mobile device. Unlike the conventional methods and systems, the embodiments of the present disclosure do not require frequency transformation.

The other conventional methods and systems detect motion blur at the time of capture and are not capable of detecting blur at the time after the image is already captured. Unlike the conventional methods and systems, the embodiments of the present disclosure detect blur at any point in a time line of obtaining and processing the image including, but not limited to during capture, post capture after saving to gallery, or after uploading to/downloading from a social networking service.

FIGS. 1A-1D are photographic images illustrating a blur due to subject in motion, the camera in motion, the autofocus failure, and intentional blur, respectively.

Figure 1B:
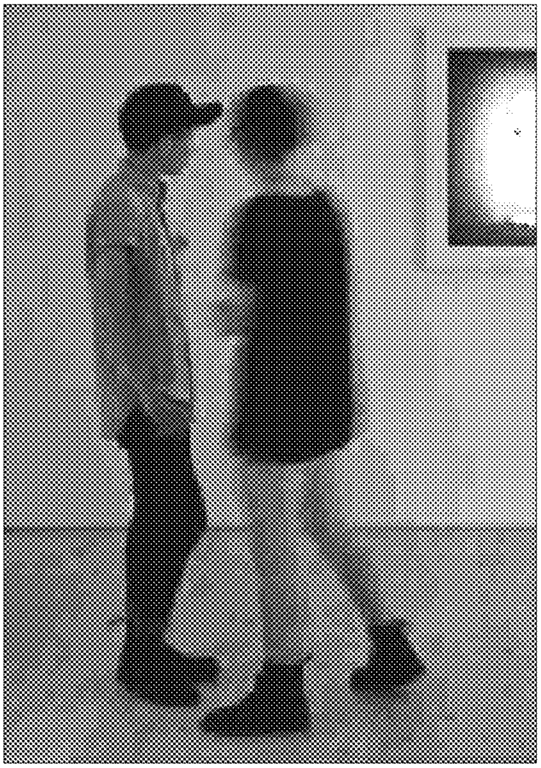
FIG. 1B (Related Art)
Figure 1C:
FIG. 1C (Related Art)
Figure 1D:
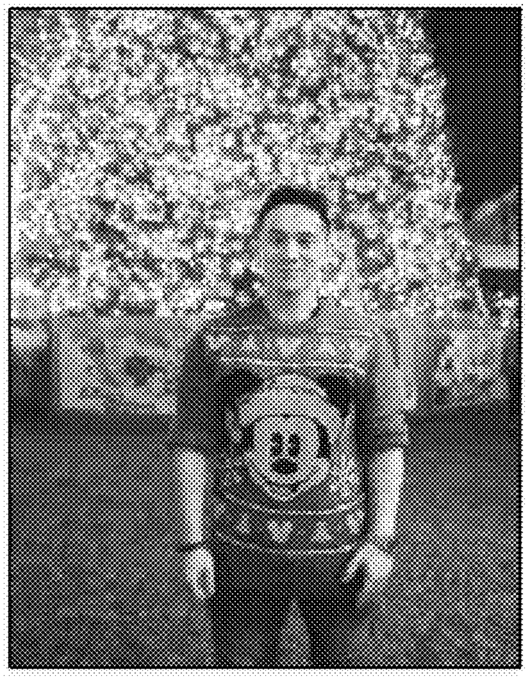
FIG. 1D (Related Art)
Figure 2:
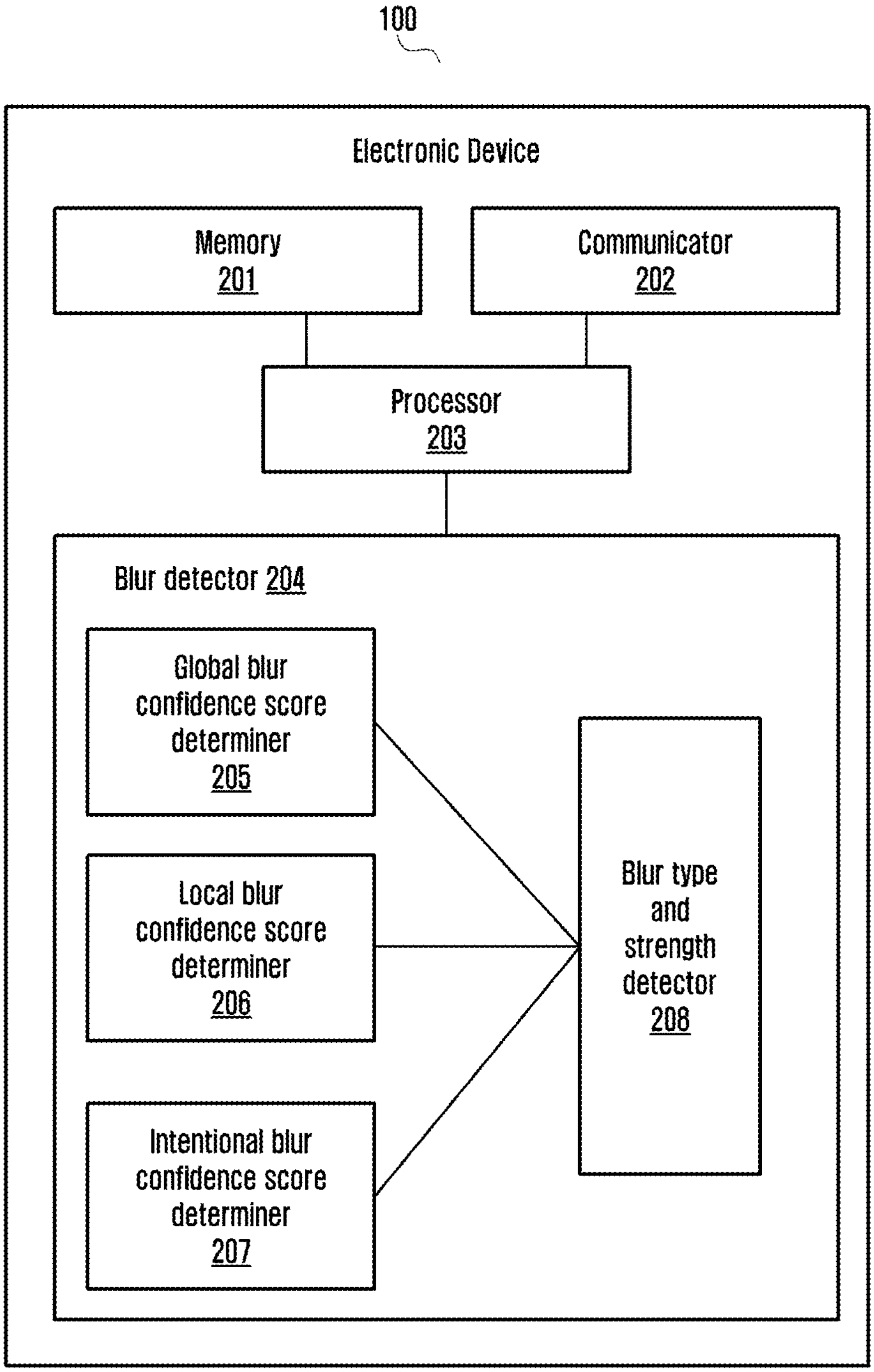
FIG. 2 is a block diagram of an electronic device for detecting blur in an input image, according to the embodiments as disclosed herein.
Figure 3:
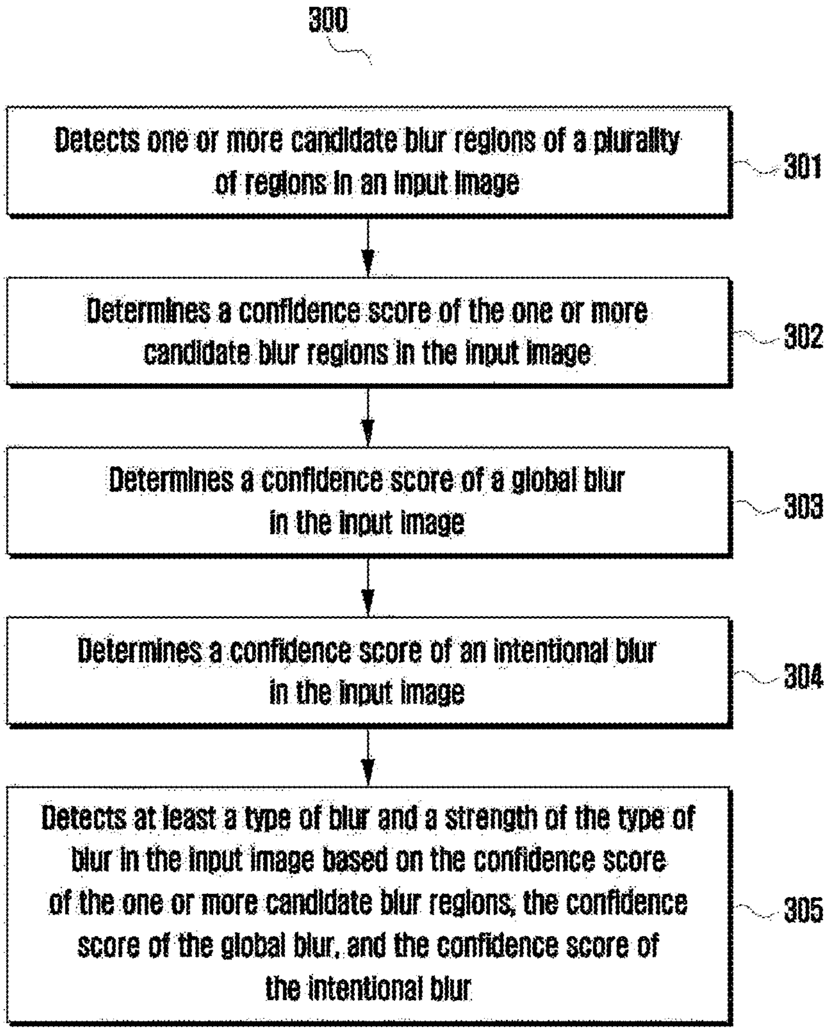
FIG. 3 is a flow chart illustrating a method of detecting blur in the input image, according to the embodiments as disclosed herein.

Generally, blur in images are caused due to one of the four possible reasons, 1) blur due to subject in motion as shown in FIG. 1A, 2) blur due to the camera in motion as shown in FIG. 1B, 3) blur due to auto-focus failure as shown in FIG. 1C 4) blur due to intentional lens or bokeh blur as shown in FIG. 1D.

Figure 1E:
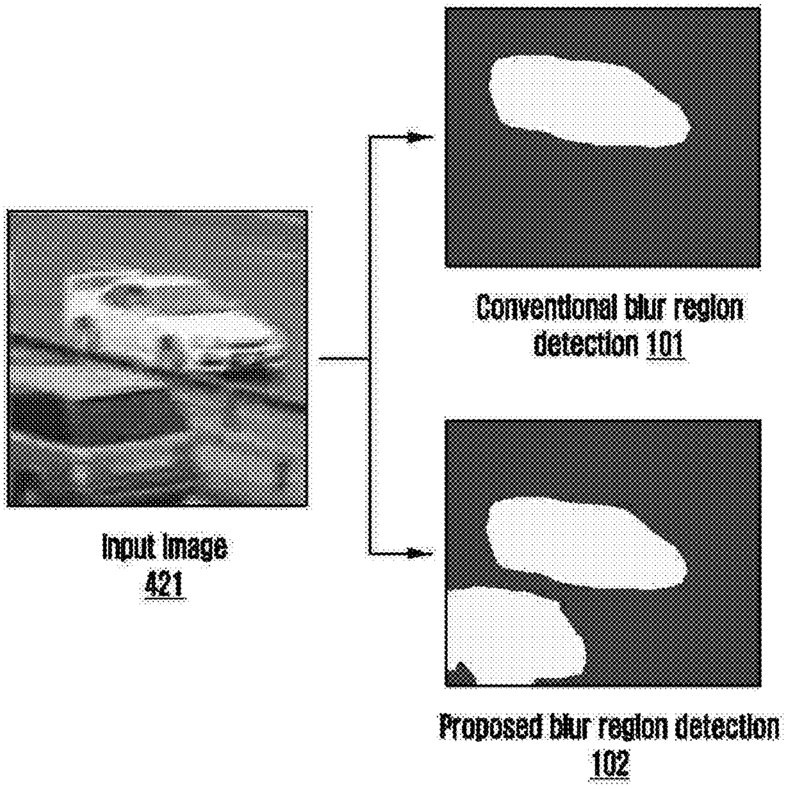
FIG. 1E is a sequence diagram illustrating a comparison of conventional and proposed detection of local regions for de-blurring.

FIG. 1E is a sequence diagram illustrating a comparison of conventional and proposed detection of local regions for de-blurring.

The conventional methods and systems detects one salient object for de-blurring (101) in an input image (421). Unlike the conventional methods and systems, the embodiments of the present disclosure detect multiple local regions for de-blurring (102) in the input image (421).

The conventional methods and systems fail to detect global de-blur when whole image is of interest. The conventional methods and systems select a sub-region of interest forcefully and only de-blur that region. Unlike the conventional methods and systems, the embodiments of the present disclosure focus on sharpness defined by pixel contribution and therefore, evaluate the input image (421) in terms of perceptual impact of de-blurring to a user.

Referring now to the drawings and more particularly to FIGS. 2 through 15, where similar reference characters denote corresponding features consistently throughout the figures, there are shown embodiments of the present disclosure.

FIG. 2 is a block diagram of an electronic device (100) for detecting blur in an input image, according to the embodiments as disclosed herein.

According to one or more embodiments, the electronic device (100) includes a memory (201), a communicator (202), a processor (203) and a blur detector (204). The blur detector (204) includes a global blur confidence score determiner (205), a local blur confidence score determiner (206), an intentional blur confidence score determiner (207) and a blur type and strength detector (208). The blur detector (204) may be implemented as a part of the processor (203) such as an image processor. In one or more examples, the blur detector (204) may be specialized circuitry or a processor in addition to the processor 203.

The electronic device (100) is configured to detect blur in the input image, according to one or more embodiments as disclosed herein. Examples of the electronic device (100) include, but are not limited, to a smartphone, a tablet computer, a Personal Digital Assistance (PDA), an Internet of Things (IoT) device, an AR device, a VR device, and a wearable device.

In one or more embodiments, the memory (201) stores instructions to be executed by the processor (203). The memory (201) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (201) may, in some examples, be considered a non-transitory storage medium. The term "non-transitory" may indicate that the storage medium is not embodied in a carrier wave or a propagated signal. However, the term "non-transitory" should not be interpreted that the memory (201) is non-movable. In some examples, the memory (201) can be configured to store larger amounts of information than the memory. In certain examples, a non-transitory storage medium may store data that can, over time, change (e.g., in Random Access Memory (RAM) or cache). The memory (201) can be an internal storage unit or it can be an external storage unit of the electronic device (100), a cloud storage, or any other type of external storage.

In one or more examples, the processor (203) communicates with the memory (201), the processor (203) is configured to execute instructions stored in the memory (201) and to perform various processes. The processor (203) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In one or more examples, the communicator (202) is configured for communicating internally between internal hardware components and with external devices (For example, eNodeB, gNodeB, server, etc.) via one or more networks (e.g. Radio technology). The communicator (202) includes an electronic circuit specific to a standard that enables wired or wireless communication.

In one or more examples, the blur detector is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In one or more examples, the global blur confidence score determiner (205) determines a confidence score of a global blur in the input image. The local blur confidence score determiner (206) detects one or more candidate blur regions of a plurality of regions in the input image and determines a confidence score of the one or more candidate blur regions in the input image. The intentional blur confidence score determiner (207) determines a confidence score of an intentional blur in the input image and the blur type. Further, the blur type and strength detector (208) detects at least a type of blur and a strength of the type of blur in the input image based on the confidence score of the one or more candidate blur regions, the confidence score of the global blur, and the confidence score of the intentional blur.

In one or more embodiments, the blur detector (204) is configured to measure a plurality of entropies of the plurality of regions in the input image. The blur detector (204) is further configured to classify a first set of regions of the plurality of regions with entropies lower than a first threshold as sharp, a second set of regions of the plurality of regions with entropies higher than a second threshold as blur, and a third set of regions of the plurality of regions with entropies higher than the first threshold and lower than the second threshold as the candidate blur regions. In one or more examples, the second threshold is higher than the first threshold. In one or more examples, the electronic device (100) is preconfigured with the first and second thresholds. In one or more examples, the electronic device (100) dynamically determines the first and second threshold based on a set of images obtained by the electronic device (100).

In one or more embodiments, the blur detector (204) is configured to measure the plurality of entropies of the plurality of regions in the input image. The blur detector (204) is further configured to determine a value of the entropies to be low towards center of the input image and the value of the entropies to be high towards edges of the input image. The blur detector (204) is further configured to determine the confidence score of the intentional blur to be high. For example, an image may include a first region having a circle with a radius r, or a square with a length x that encompasses the center. The image may include a second region that has a distance y from the edges of the image. If the entropy in the first region is lower than an entropy threshold and the entropy of the second region is higher than the entropy threshold, the confidence score of the intentional blur may be characterized as high.

In one or more embodiments, the blur detector (204) is configured to generate a segmented image indicating the one or more candidate blur regions by fusing a candidate blur regions mask with the input image, where the candidate blur regions mask indicates entropies of the plurality of regions in the input image. The blur detector (204) is further configured to determine the confidence score of each of the one or more candidate blur regions in the segmented image.

In one or more embodiments, the blur detector (204) is configured to analyze the input image holistically. For example, the blur detector (204) is configured to analyze an entirety of the input image to determine a global blur of the input image. The blur detector (204) is further configured to determine the confidence score of the global blur in the input image based on a level of existence of the global blur in the input image.

In one or more embodiments, the blur detector (204) is configured to compute a first weight for the confidence score of the one or more candidate blur regions, based on a percentage of pixels associated with the one or more candidate blur regions, a second weight for the confidence score of the global blur based on a percentage of pixels associated with the global blur regions, and a third weight for the confidence score of the intentional blur based on a percentage of pixels associated with the intentional blur regions. The blur detector (204) is further configured to detect the type of blur and the strength of the type of blur in the input image using the first weight, the second weight, the third weight, the confidence score of the one or more candidate blur regions, the confidence score of the global blur, and the confidence score of an intentional blur.

In one or more embodiments, the blur detector (204) is configured to determine that at least the type of blur and the strength of the type of blur meets a blur threshold (e.g., greater than or equal to a blur threshold). The blur detector (204) is further configured to display a recommendation on the electronic device (100), where the recommendation is related to at least one of deletion of the input image, an enhancement of the input image, deblurring the input image, recapturing the input image. The blur detector (204) is further configured to generate a tag comprising an image quality parameter including at least one of the type of blur and the strength of the type of blur, and storing the tag associated with the input image in a media database.

In one or more embodiments, the blur detector (204) is configured to detect the global blur in the input image for which blur correction is required. The blur detector (204) is further configured to estimate a global blur probability as a measure of a confidence level associated with the global blur. The blur detector (204) is further configured to detect the one or more local regions having candidate blur in the image. The blur detector (204) is further configured to measure entropies in the detected one or more local regions. The blur detector (204) is further configured to select the one or more local regions having a pre-defined entropy range for local blur correction. The blur detector (204) is further configured to estimate a local blur probability as a measure of a confidence level in the presence of the local blur. The blur detector (204) is further configured to detect one or more sharp regions having pre-defined entropy range and estimate an intentional blur probability as a measure of a confidence level in presence of blur introduced by user intentionally. The blur detector (204) is further configured to fuse the global blur probability, the local blur probability, and the intentional blur probability to generate a determination on correcting the global blur and/or the local blur.

FIG. 3 is a flow chart illustrating a method of detecting blur in the input image, according to the embodiments as disclosed herein. The process illustrated in FIG. 3 may be performed by the electronic device (100).

At operation 301, the electronic device (100) detects the one or more candidate blur regions of the plurality of regions in the input image.

At operation 302, the electronic device (100) determines the confidence score of the one or more candidate blur regions in the input image.

At operation 303, the electronic device (100) determines the confidence score of the global blur in the input image.

At operation 304, the electronic device (100) determines the confidence score of the intentional blur in the input image.

At operation 305, the electronic device (100) detects at least the type of blur and the strength of the type of blur in the input image based on the confidence score of the one or more candidate blur regions, the confidence score of the global blur, and the confidence score of the intentional blur.

The various actions, acts, blocks, operations, or the like in the flow diagram may be performed in the order presented, in a different order or simultaneously. Further, in some embodiments, some of the actions, acts, blocks, operations, or the like may be omitted, added, modified, skipped, or the like without departing from the scope of the disclosure.

Figure 4A:
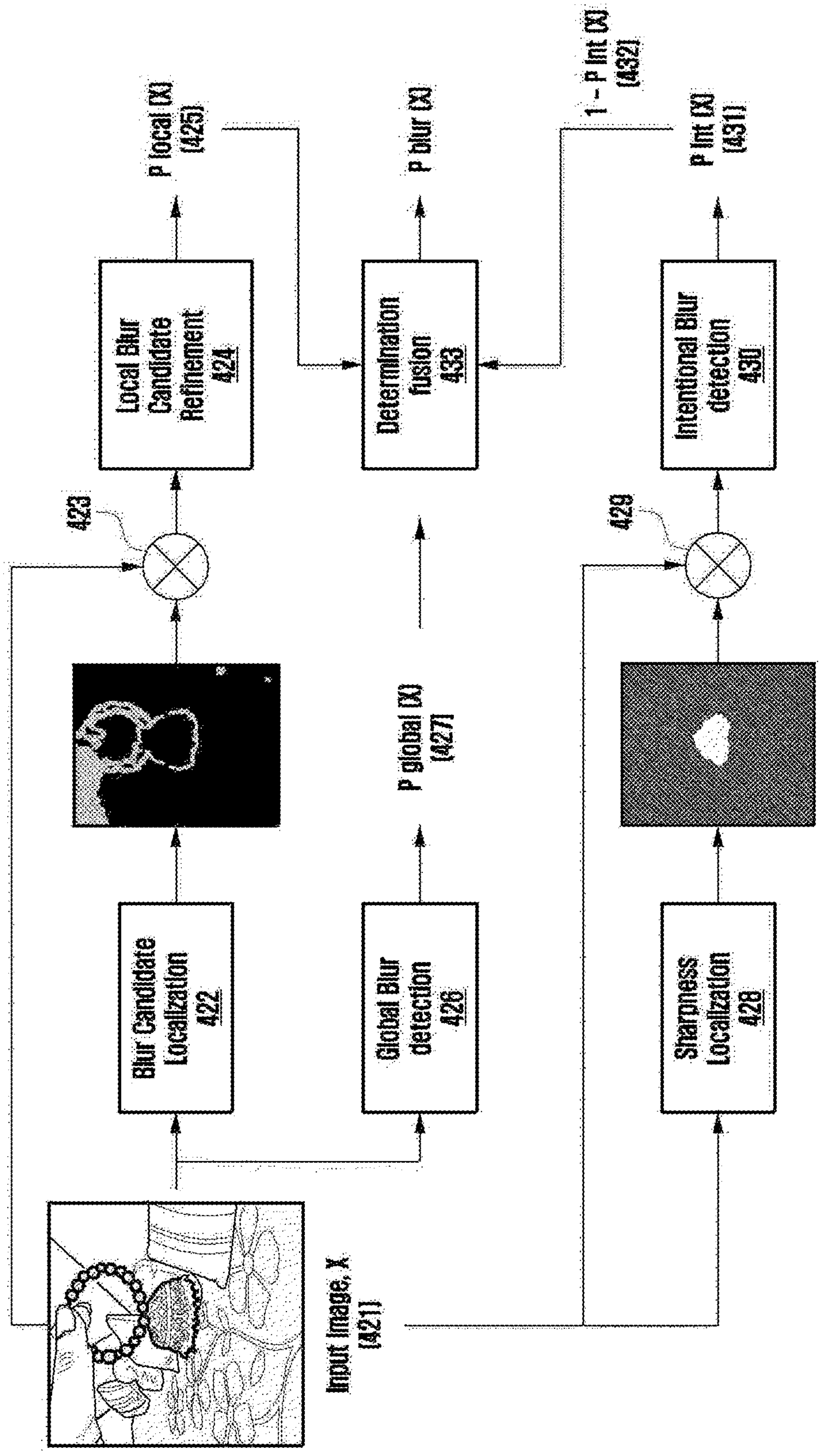
FIG. 4A is a sequence diagram illustrating operations performed for determining a type and a strength of the blur in the input image, according to the embodiments as disclosed herein.

FIG. 4A is a sequence diagram illustrating operations performed for determining the type and the strength of the blur in the input image, according to the embodiments as disclosed herein.

At 422, the electronic device (100) may detect one or more local regions having candidate blur in the input image. For example, the electronic device (100) identifies regions in the input image that are candidates for presence of blur. In one or more examples, the entropy in a neighbourhood of each pixel is computed, and the pixel is marked as a blur candidate if $h>\text{entropy}>1$ Inputs: Image, $X_{W \times H \times C}$ Outputs: Candidate mask $M_{W \times H}$ At 423, the electronic device (100) measures entropies in the detected one or more local regions. Further, the electronic device (100) fuses the input image with a mask.

At 424, the electronic device (100) selects the one or more local regions having pre-defined entropy range for local blur correction. The electronic device (100) predicts whether blur is present in the identified candidate regions. In one or more examples, the operation at 424 may use a deep learning model that takes the combination of the input image and the blur candidate mask, and outputs a blur probability for identified candidates. In one or more examples, global blur detection is different from local blur detection as the local blur detection looks at candidate regions instead of the holistic image Inputs: Image, $X_{W \times H \times C}$ and Candidate Mask $M_{W \times H}$ Outputs: Probability of local blur in image, $P_{local}(x)$ At 425, the electronic device (100) estimates the local blur probability as the measure of the confidence level associated with the local blur.

At 426, the electronic device (100) detects the global blur in the input image for which blur correction is required. The electronic device (100) predicts whether global blur is present in the input image. The operation at 426 may use a deep learning model that looks at a holistic image (e.g., entire image) and predicts the probability of global blur in the input image Inputs: Image, $X_{W \times H \times C}$ Outputs: Probability of global blur in image, $P_{global}(X)$ At 427, the electronic device (100) estimates the global blur probability as the measure of the confidence level associated with the global blur.

At 428, the electronic device (100) detects one or more sharp regions having pre-defined entropy range. The electronic device (100) localizes sharp regions in the input image. In one or more examples, the entropy in a neighbourhood of each pixel is computed, and the pixel is marked as sharp if 1>entropy (e.g., computer entropy less than 1).

Inputs: Image, $X_{W \times H \times C}$

Outputs: Sharpness mask, $S_{W \times H}$

At 429, the electronic device (100) fuses the input image with a sharpness mask.

At 430, the electronic device (100) detects the presence of intentional blur in the input image. The electronic device (100) predicts whether blur in the input image is intentionally introduced by the user. The operation at 430 may use a deep learning model that takes the input image and the sharpness mask as the input and outputs the probability of blur being intentional. The intentional blur detection detects lens blur or bokeh blur images as sharp or not degraded by blur.

Inputs: Image, $X_{W \times H \times C}$ and Sharpness Mask $S_{W \times H}$

Outputs: Probability of intentional blur in image, $P_{int}(X)$

At 431 and 432, the electronic device (100) estimates the intentional blur probability as the measure of the confidence level associated with the blur introduced by the user intentionally.

At 433, the electronic device (100) fuses the determinations from Global, Local, and Intentional blur detections to make a final determination on whether the image is degraded by blur or not.

Figure 4B:
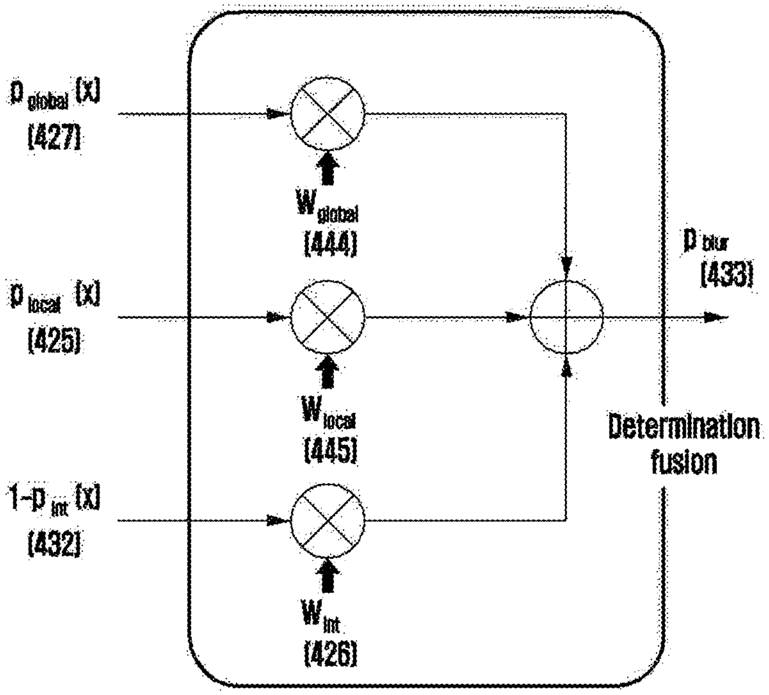
FIG. 4B is a schematic diagram illustrating operations performed for determining the type and the strength of the blur using a probability of blur in the input image, according to the embodiments as disclosed herein.

Inputs: A probability of global blur, $P_{global}(X)$, a probability of local blur, $P_{local}(X)$, and a probability of intentional blur, $P_{int}(X)$ Outputs: a probability of blur in image, $P_{blur}(X)$ FIG. 4B is a schematic diagram illustrating operations performed for determining the type and the strength of the blur using the probability of blur in the input image, according to the embodiments as disclosed herein.

The probability of the input image being blurry is determined as a convex combination of the global, the local, and the intentional blur probabilities:

$$P_{blur}(x) = W_{global}P_{global}(x) + W_{local}P_{local}(x) + W_{int}(1 - P_{int}(x)) \quad \text{Eq. (1)}$$

where, $W_{global}$(444), $W_{local}$(445), and $W_{int}$(426) represent the weights of the global, local and intentional blurs correspondingly towards the final determination of type of blur. The weights are determined based on the percentage of pixels involved in making determination for each branch:

$$W_{global} = \frac{e^{C_{global}}}{e^{C_{global}} + e^{C_{local}} + e^{C_{int}}}, \quad \text{Eq. (2)}$$

$$W_{local} = \frac{e^{C_{local}}}{e^{C_{global}} + e^{C_{local}} + e^{C_{int}}},$$

$$W_{int} = \frac{e^{C_{int}}}{e^{C_{global}} + e^{C_{local}} + e^{C_{int}}}$$

$$C_{local} = \frac{\text{\# Blur Pixels in entropy map}}{\text{Total \# Pixels in image}}, \quad \text{Eq. (3)}$$

$$C_{local} = \frac{\text{\# Candidate Pixels in entropy map}}{\text{Total \# Pixels in image}},$$

$$C_{int} = \frac{\text{\# Sharp Pixels in entropy map}}{\text{Total \# Pixels in image}}$$

where e represents exponential function. The weights may be dependent on how many pixels are contributing to the decision for that particular branch. For example, if a number of pixels contributing to the local blur decision is higher in the image, the weight for local branch is higher.

In one or more embodiments, C_global is a fraction of pixels contributing towards decision of global motion blur, C_local is the fraction of pixels contributing towards decision of local motion blur, C_int is the fraction of pixels contributing towards decision of intentional blur. Further, W_global, W_local, W_int are the contributions of global motion, local motion, and intentional blur, respectively, towards the final decision, and e is the exponential function.

In one or more embodiments, the contribution of each branch is dependent upon a fraction of pixels contributing towards the determination of that branch. Hence, fusion based on portion of image contributing to blur determination allows the input image to be evaluated in terms of perceptual impact of de-blurring to the user.

Figure 4C:
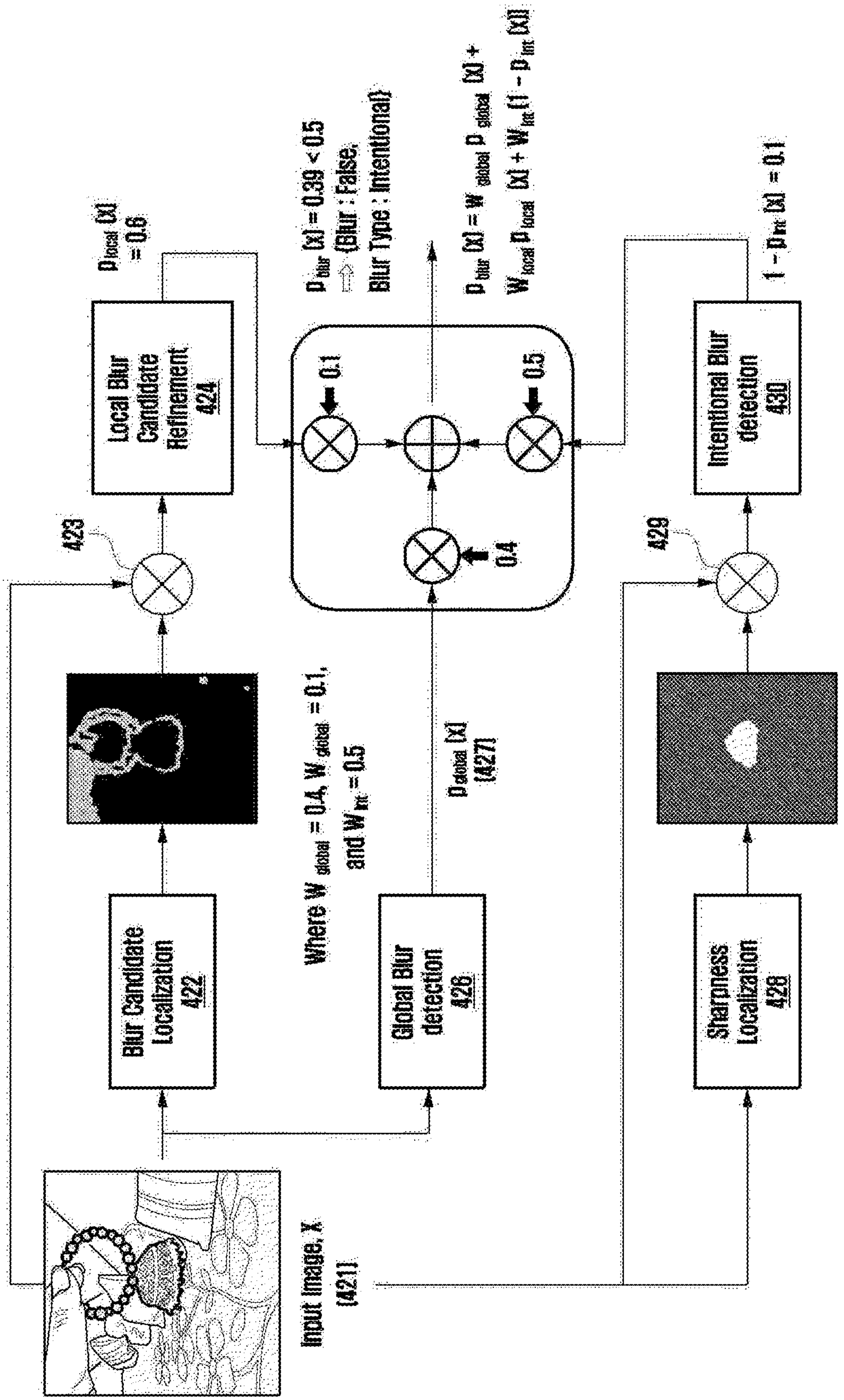
FIG. 4C is a sequence diagram illustrating operations performed for detecting an intentional blur in the input image, according to the embodiments as disclosed herein.

FIG. 4C is a sequence diagram illustrating operations performed for detecting the intentional blur in the input image, according to an example.

In FIG. 4C, the blur type is detected as intentional blur based on the probability of global blur, the probability of local blur, and the probability of intentional blur.

$$P_{blur}(x) = 0.39 < 0.5 \Rightarrow \{\text{Blur: False, BlurType: intentional}\} \quad \text{Eq. (4)}$$

Further, the input image in FIG. 4C has minor local blur (P_local(x)=0.6) in the thumb region, and therefore, de-blurring is not required in the thumb region. The determination results in determining an amount of blur to be minimal, and the region is also small.

Figure 4D:
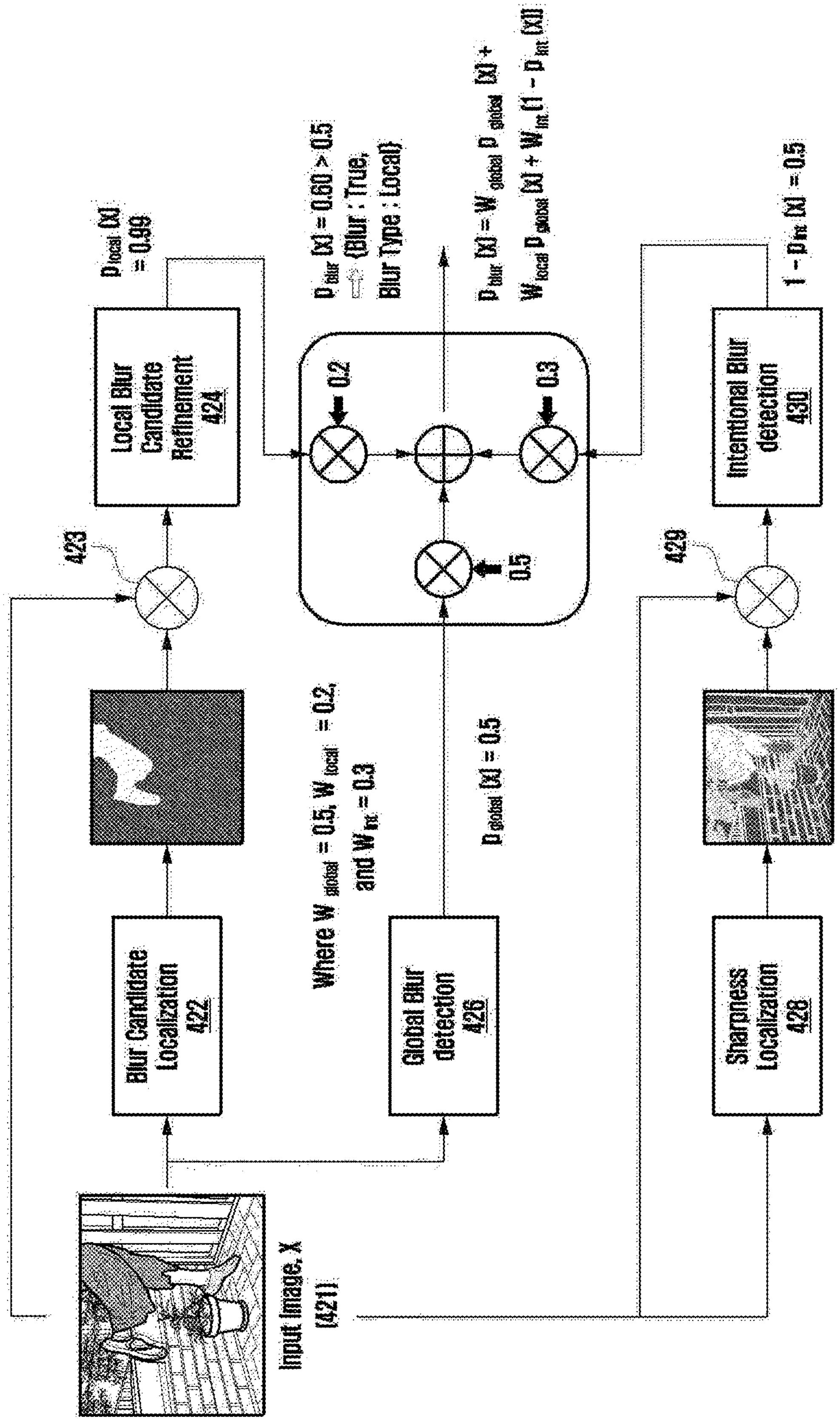
FIG. 4D is a sequence diagram illustrating operations performed for detecting a local blur in the input image, according to the embodiments as disclosed herein.

FIG. 4D is a sequence diagram illustrating operations performed for detecting the local blur in the input image, according to an example.

In FIG. 4D, the blur type is detected as local blur based on the probability of global blur, the probability of local blur, and the probability of the intentional blur.

$$P_{blur}(x) = 0.60 < 0.5 \Rightarrow \{\text{Blur: True, BlurType: local}\} \quad \text{Eq. (5)}$$

Further, in the FIG. 4D, a strong local blur (P_(x)=0.99) is present in the leg region, and therefore, de-blurring is required. The determination results in determining that an amount of the blur is very high, and that performing the de-blurring helps significantly to improve user experience.

Figure 4E:
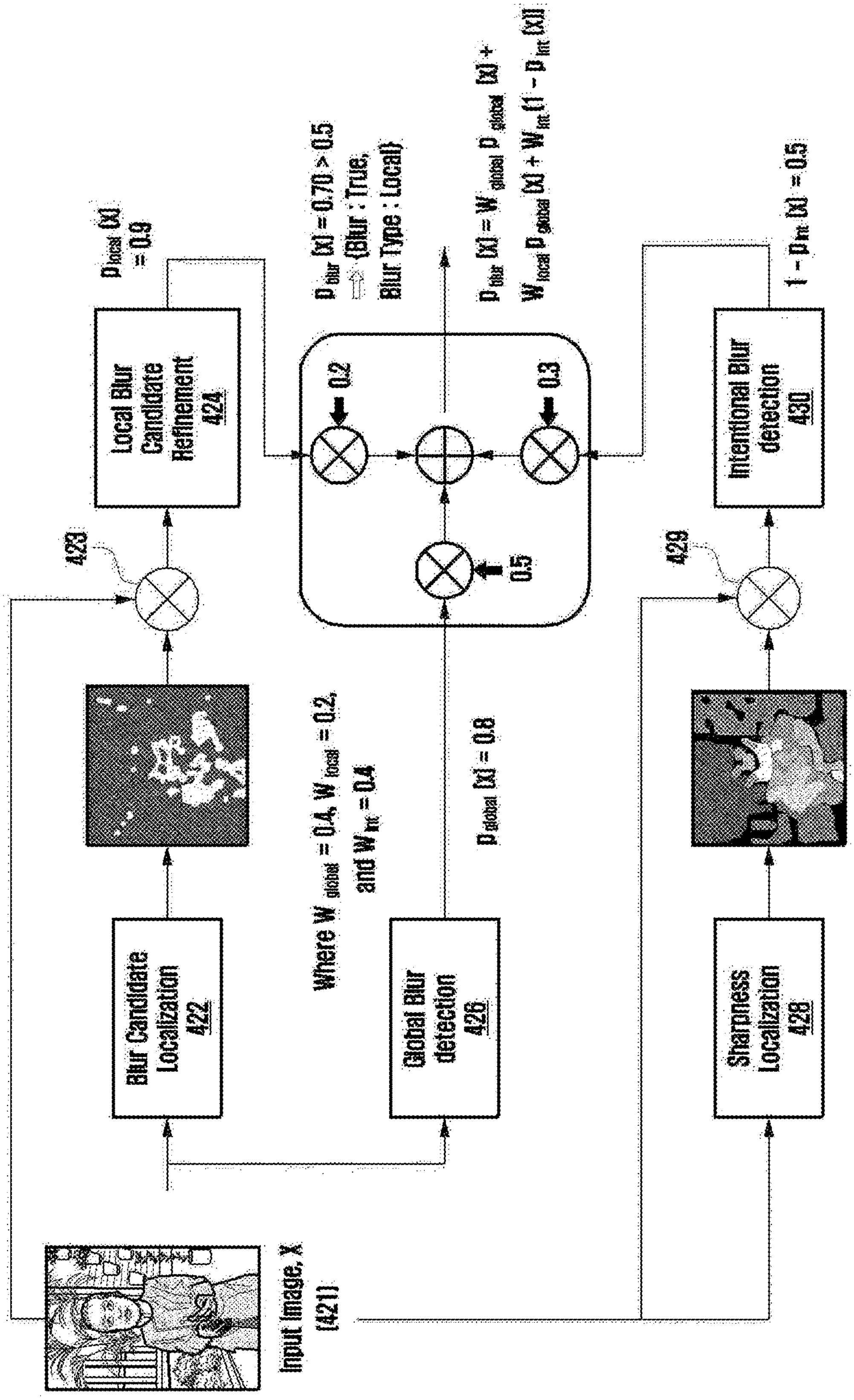
FIG. 4E is a sequence diagram illustrating operations performed for detecting the local blur with the blur in foreground in the input image, according to the embodiments as disclosed herein.

FIG. 4E is a sequence diagram illustrating operations performed for detecting the local blur with the blur in foreground in the input image, according to an example.

In FIG. 4E, the blur type is detected as the local blur due to blur in a foreground of the input image based on the probability of global blur, the probability of local blur, and the probability of intentional blur.

$$P_{blur}(x) = 0.70 < 0.5 \Rightarrow \{\text{Blur: True, BlurType: local}\} \quad \text{Eq. (6)}$$

Figure 4F:
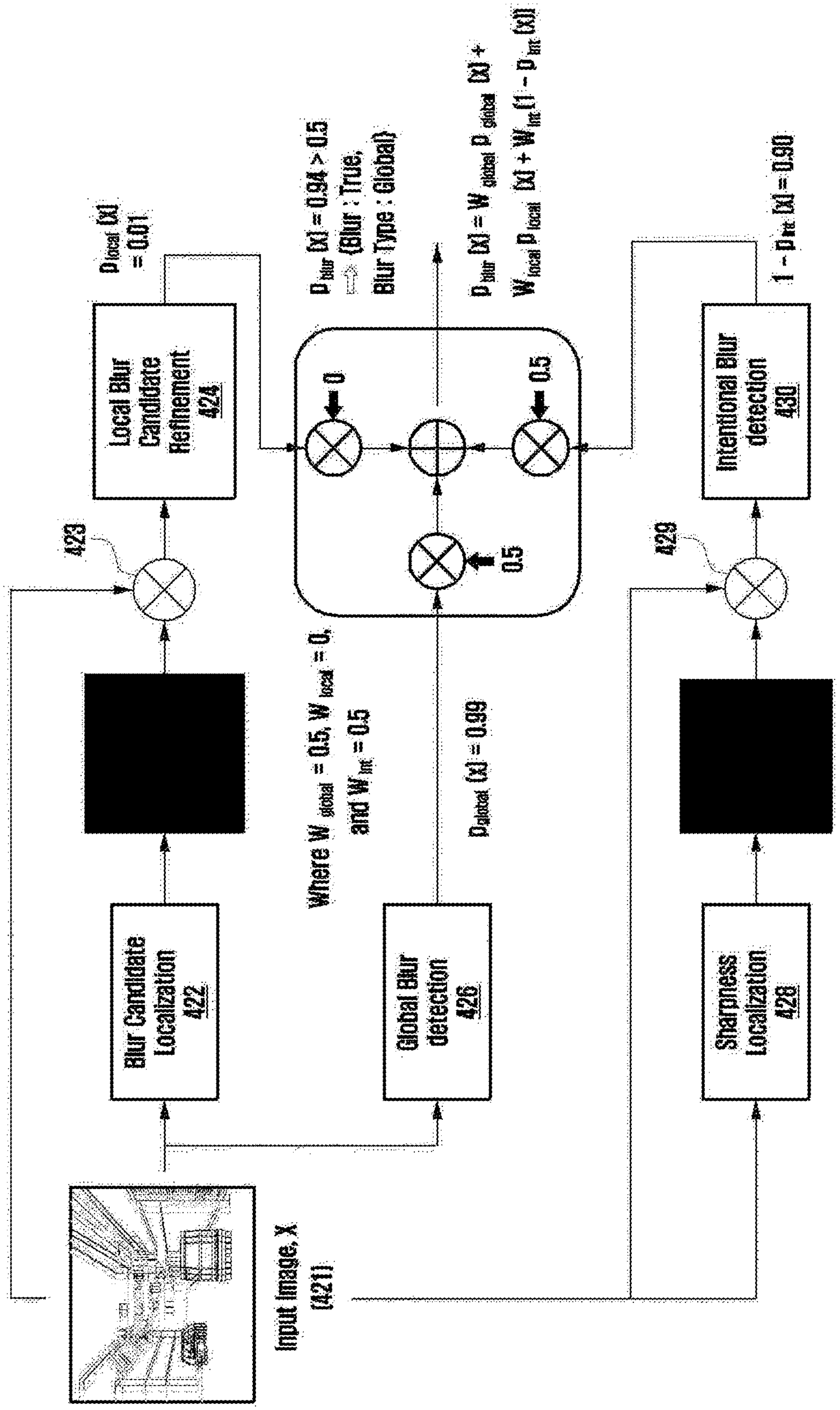
FIG. 4F is a sequence diagram illustrating operations performed for detecting a global blur in the input image, according to the embodiments as disclosed herein.

FIG. 4F is a sequence diagram illustrating operations performed for detecting the global blur in the input image, according to an example.

In FIG. 4F, the blur type is detected as the global blur based on the probability of global blur, the probability of local blur, and the probability of intentional blur.

$$P_{blur}(x) = 0.94 < 0.5 \Rightarrow \{\text{Blur: True, BlurType: Global}\} \quad \text{Eq. (7)}$$

Figure 4G:
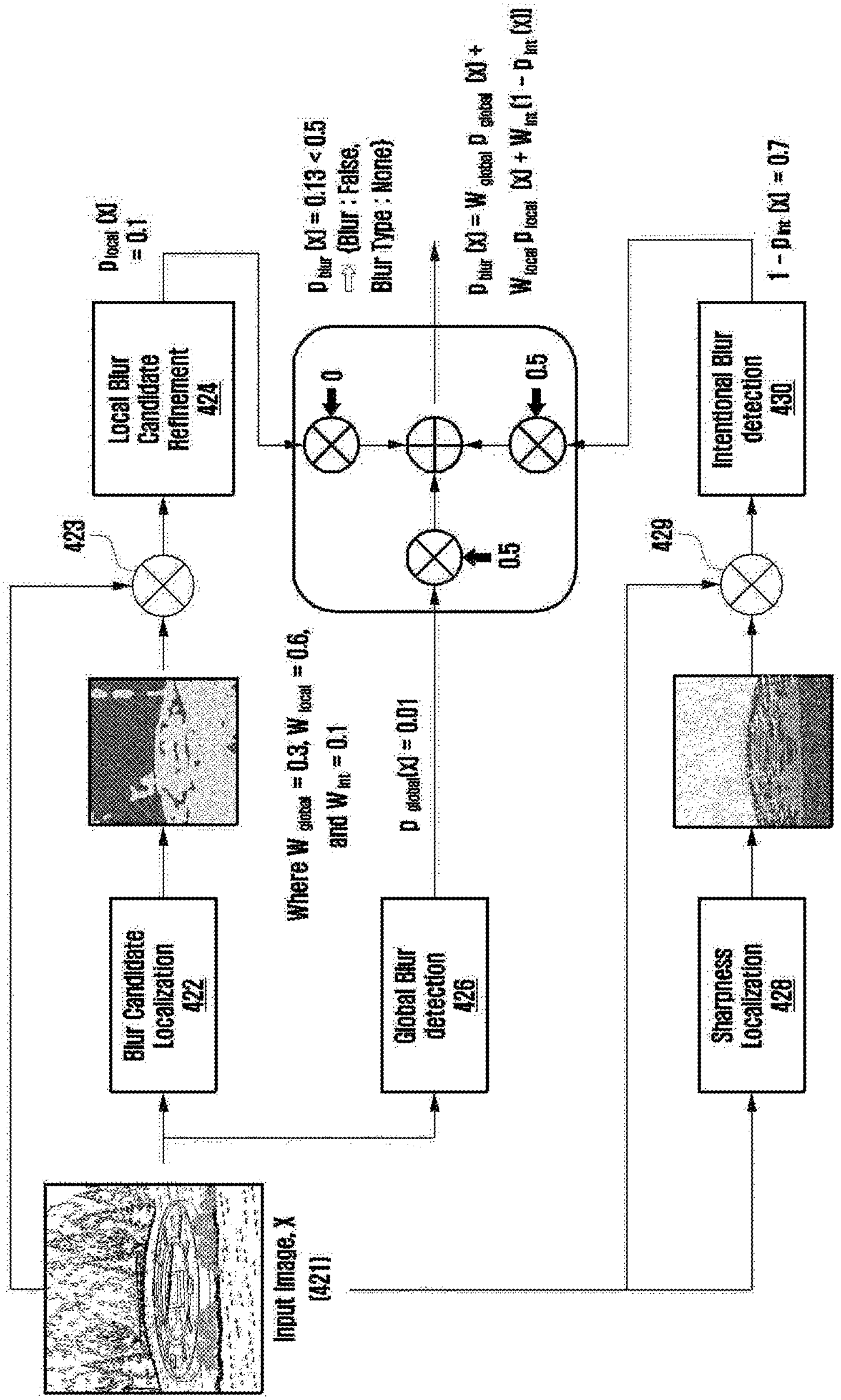
FIG. 4G is a sequence diagram illustrating operations performed for detecting a sharp in the input image, according to the embodiments as disclosed herein.

FIG. 4G is a sequence diagram illustrating operations performed for detecting the sharp in the input image, according to an example.

In FIG. 4G, the blur type is detected as the no blur that is based on the probability of global blur, the probability of local blur, and the probability of intentional blur.

$$P_{blur}(x) = 0.13 < 0.5 \Rightarrow \{\text{Blur: False, BlurType: None}\} \quad \text{Eq. (8)}$$

Figure 4H:
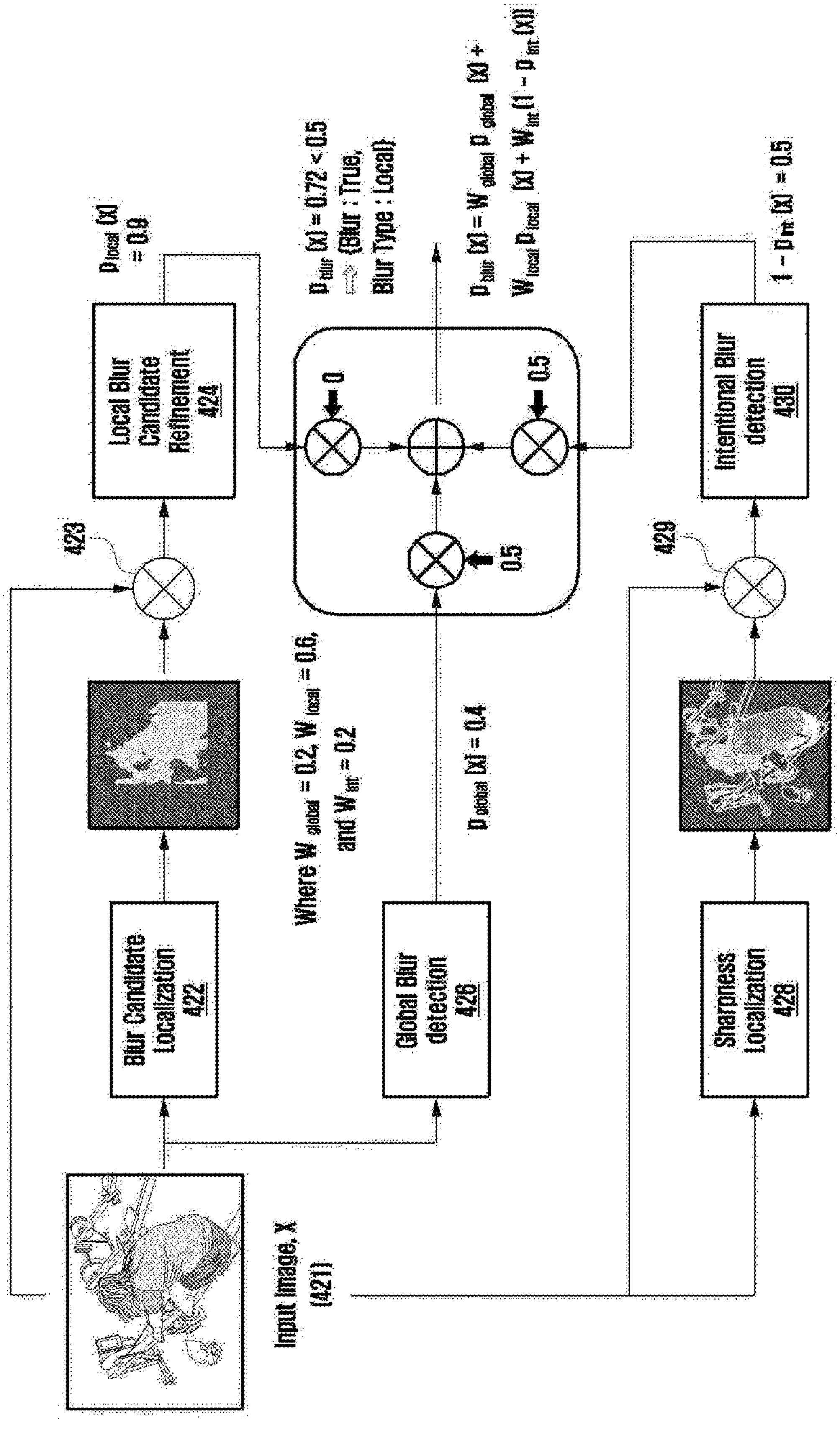
FIG. 4H is a sequence diagram illustrating another example of detecting the local blur in the input image, according to the embodiments as disclosed herein.

FIG. 4H is a sequence diagram illustrating another example of detecting the local blur in the input image, according to an example.

In FIG. 4H, the blur type is detected as the local blur due to blur in a foreground of the input image based on the probability of global blur, the probability of local blur, and the probability of intentional blur.

$$P_{blur}(x) = 0.72 < 0.5 \Rightarrow \{\text{Blur: True, BlurType: Local}\} \quad \text{Eq. (9)}$$

Figure 5:
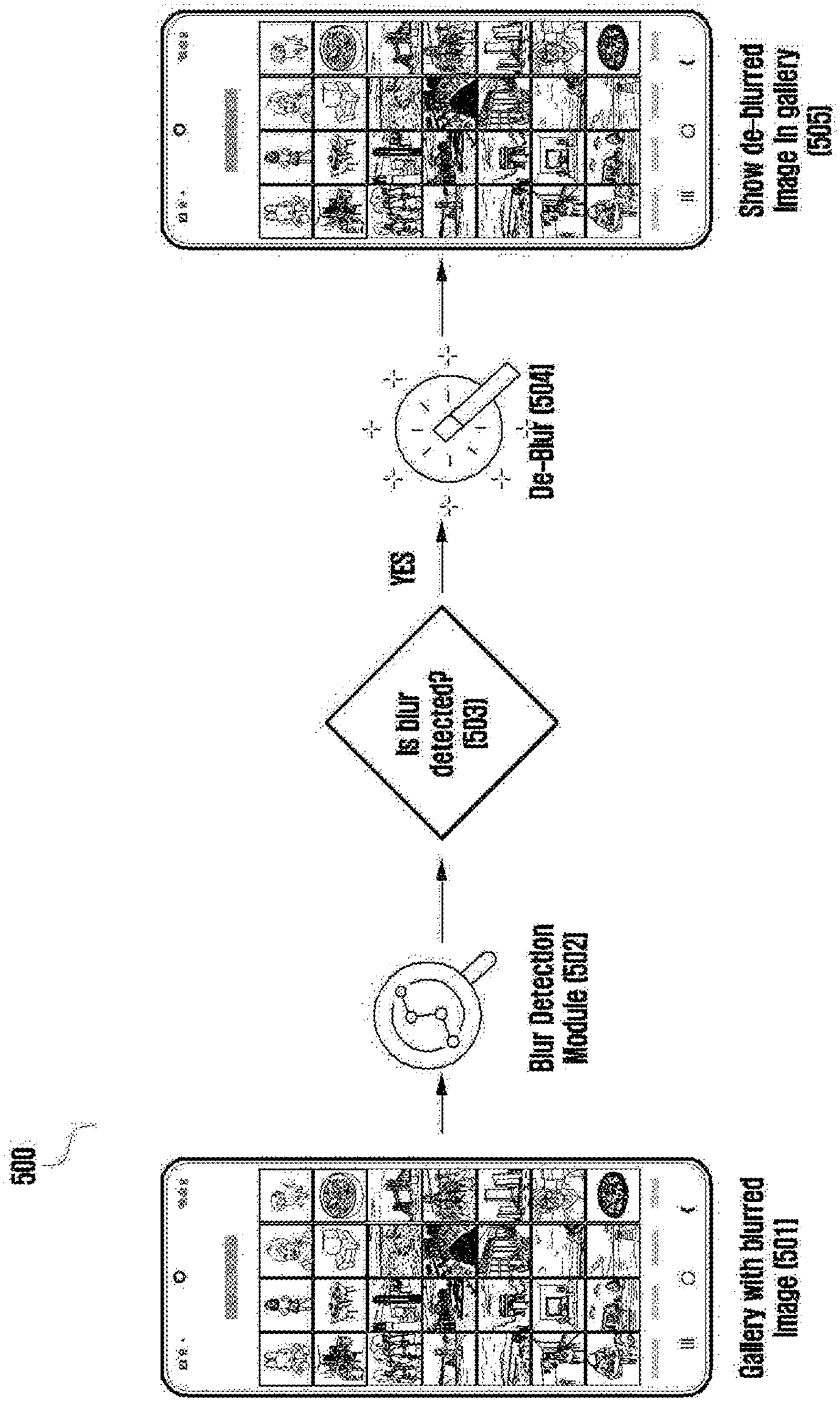
FIG. 5 is a schematic diagram illustrating a scenario in which blur is detected in images available in a gallery of the electronic device, according to the embodiments as disclosed herein.

FIG. 5 is a schematic diagram illustrating detection of blur images in the gallery, according to the embodiments as disclosed herein.

In one or more examples, a blur detection module (502) has the blur detector (204) that analyzes the gallery with blurred images (501). At (503), the blur detection module (502) determines whether the blur is detected in the image of the gallery. The blur detection module (502) request a de-blur engine (504) when blur is detected in the image. At (505), the gallery is updated with de-blurred images.

Figure 6A:
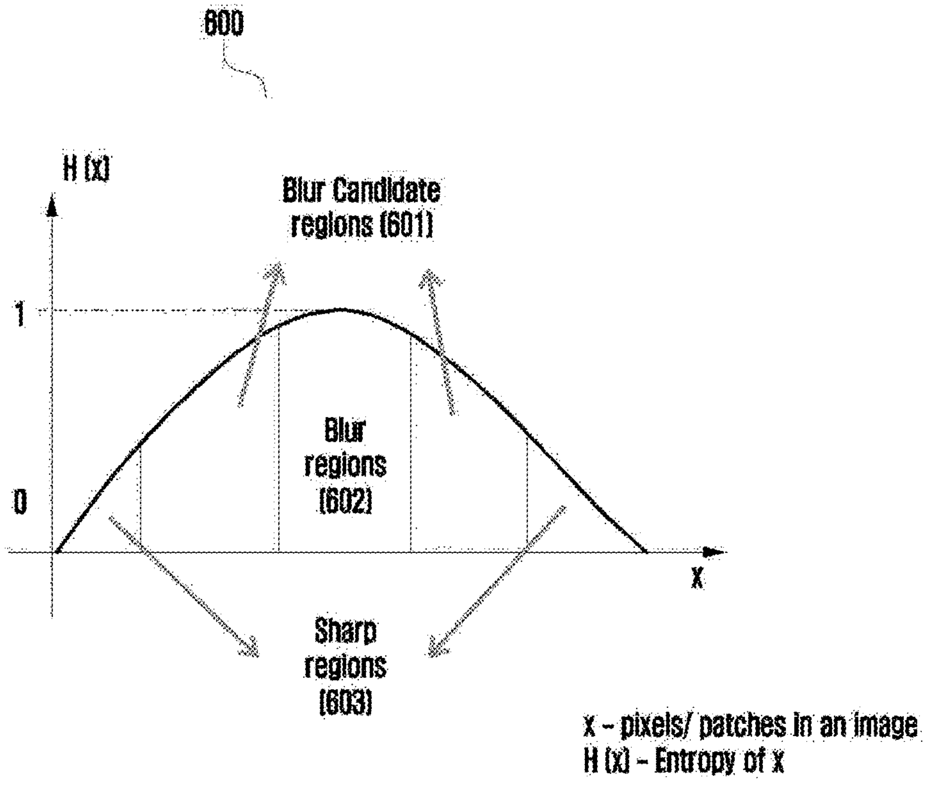
FIG. 6A is a graph diagram illustrating classification of plurality of regions based on entropies, according to the embodiments as disclosed herein.

FIG. 6A is a graph diagram (600) illustrating classification of plurality of regions based on the entropies, according to the embodiments as disclosed herein.

The electronic device (100) measures the plurality of entropies of the plurality of regions in the input image and classifies the first set of regions of the plurality of regions with entropies lower than the first threshold (e.g., ‘l’) as sharp regions (603), the second set of regions of the plurality of regions with entropies higher than the second threshold (e.g., ‘h’) as blur regions (602), which is also global blur, and the third set of regions of the plurality of regions with entropies higher than the first threshold and lower than the second threshold as the candidate blur regions (601).

Figure 6B:
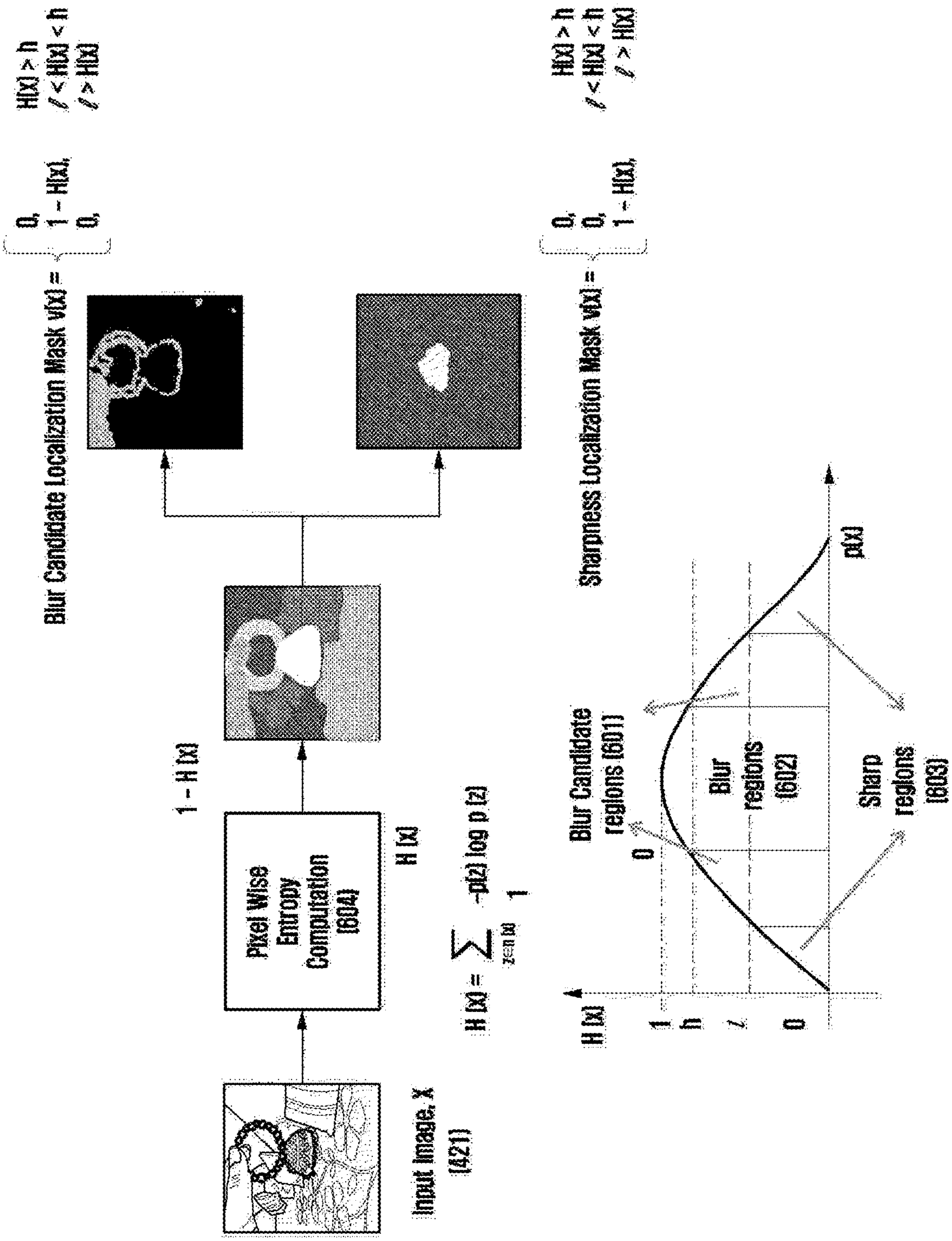
FIG. 6B is a sequence diagram illustrating a blur candidate localization and sharpness localization based on the entropies, according to the embodiments as disclosed herein.

FIG. 6B is a sequence diagram illustrating the blur candidate localization and sharpness localization based on the entropies, according to the embodiments as disclosed herein.

The input image (421) is analyzed through pixel wise entropy computation (604). The input image is analyzed to generate blur candidate localization mask and sharpness localization mask.

P(x)—probability distribution of neighbourhood of x

H(x)—entropy at pixel x z—pixel position in neighbourhood of x (n(x))

$$P(z) = \frac{v(z)}{\sum_{w \in n(x)} v(w)} \quad \text{Eq. (10)}$$

In equation 10, v(z) is the value of pixel z and v(w) is value of pixel w in the neighborhood of x.

The input image (421) describes the process of creating a candidate mask and a sharpness mask. As a first operation, the entropy mask is computed by pixel-wise entropy computation. In one or more examples, the blur candidate mask is generated by thresholding as shown in equation 10. A pixel is marked as a blur candidate if h>entropy>1. In one or more examples, the sharpness mask is generated from the entropy mask by thresholding. The pixel is marked as sharp if 1>entropy.

Figure 7A:
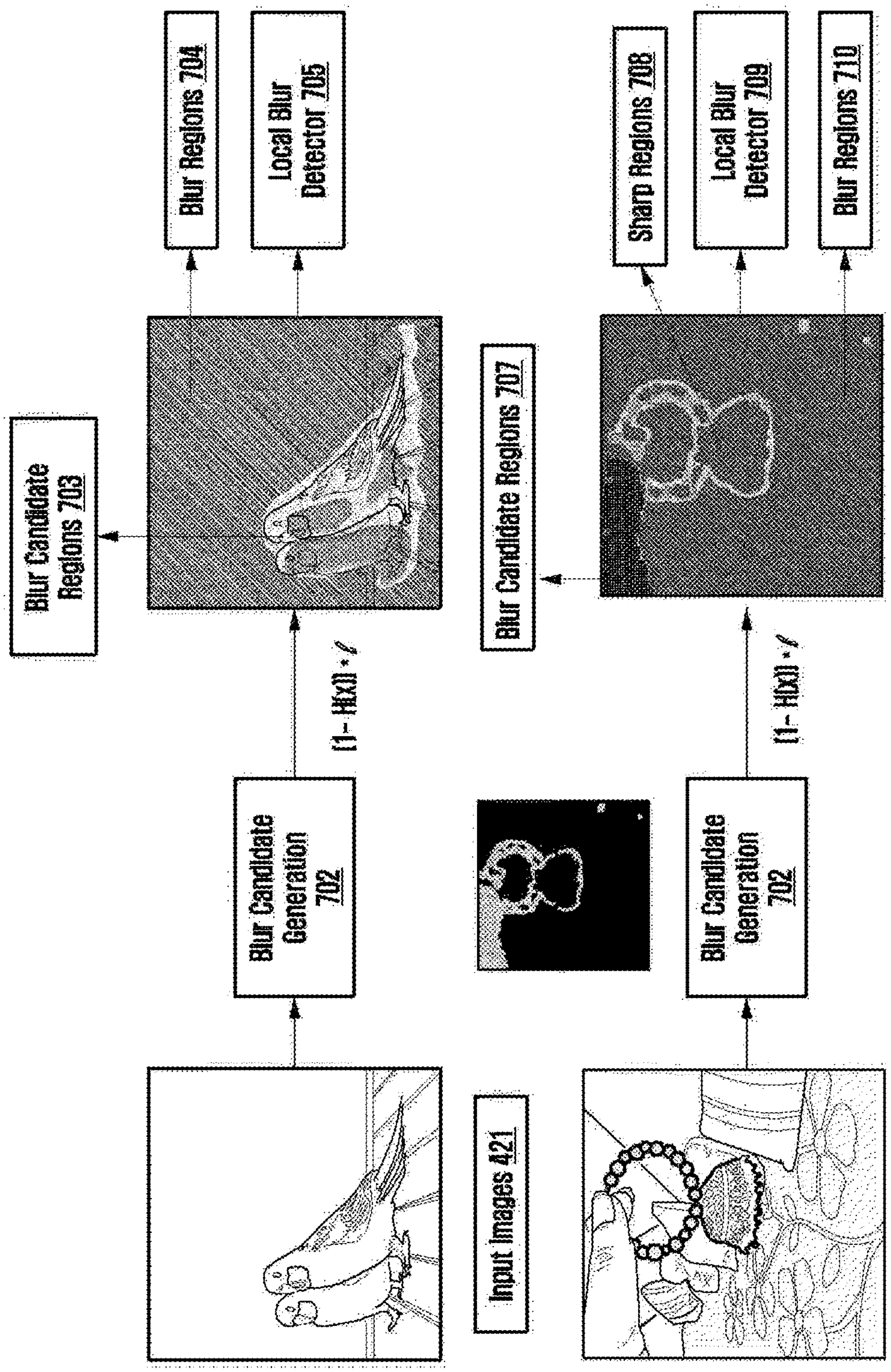
FIG. 7A is a sequence diagram illustrating detection of type of blur in the input image, according to the embodiments as disclosed herein.

FIG. 7A is a sequence diagram illustrating detection of type of blur in the input image, according to the embodiments as disclosed herein.

In one or more examples, the input images (421) are processed through blur candidate generation (702). A mask for the input images (421) is generated and the mask includes, but not limited to, blur candidate regions (703, 707), blur regions (704, 710), local blur detector (705, 709) and sharp region (708).

Figure 7B:
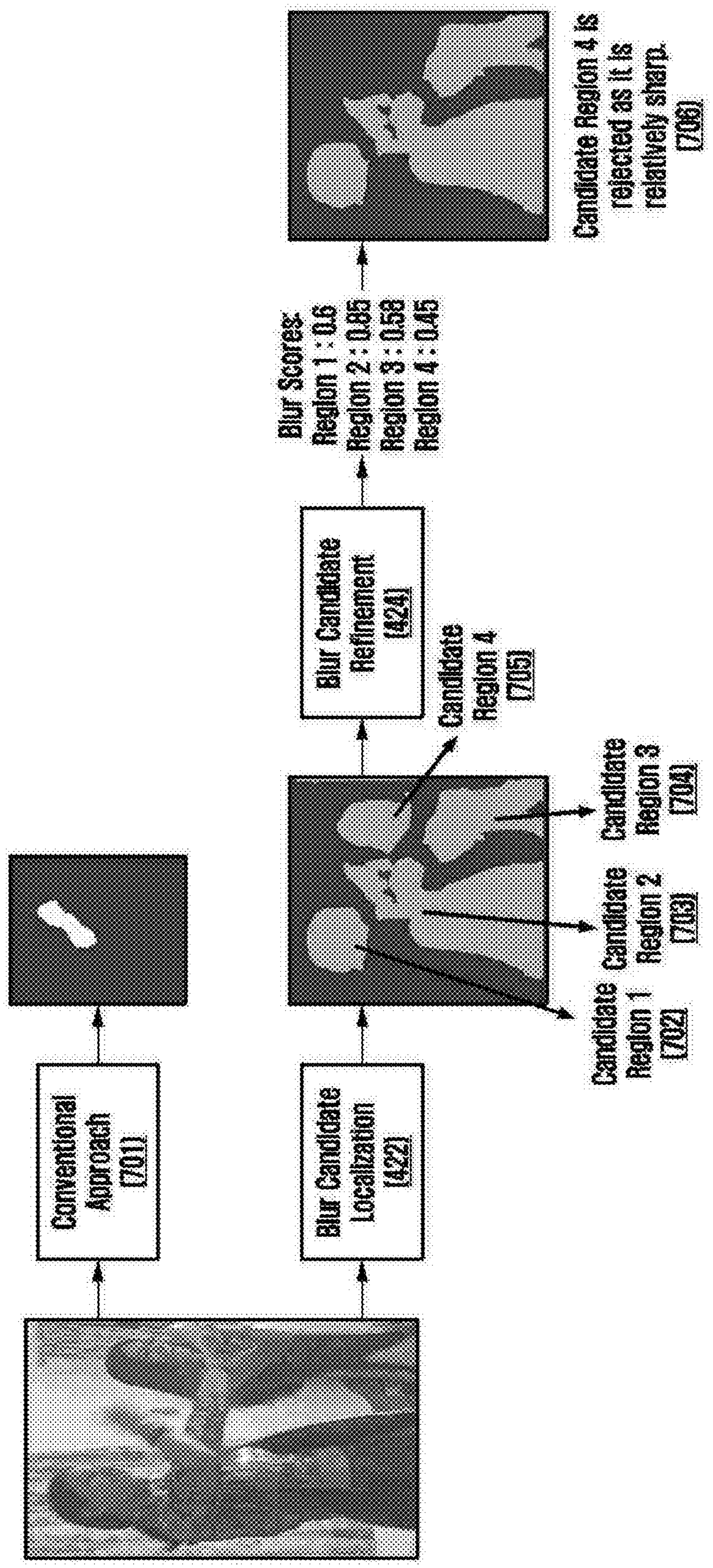
FIG. 7B is a sequence diagram illustrating local blur candidate refinement, according to the embodiments as disclosed herein.

FIG. 7B is a sequence diagram illustrating the local blur candidate refinement, according to the embodiments as disclosed herein.

Referring to FIG. 7B, blur detection of conventional approach (701) and proposed method is shown. In the proposed method and electronic device (100), the blur candidate localization (422) identifies 'candidate' regions for blur. Further, the blur candidate localization (422) allows the Local blur candidate refinement (424) block to focus on specific regions of the image which may have potential blur, and estimate a blur score for each of the candidate regions. This is followed by selection of regions that has the impact by applying the de-blurring. The Local blur candidate refinement (424) may estimate blur scores of candidate region 1 (702), candidate region 2 (703), candidate region 3 (704) and candidate region 4 (705) as 0.6, 0.85, 0.58 and 0.45, respectively.

The conventional approach (701) only marks regions as blur/no-blur, whereas the embodiments of the present disclosure first identifies candidates, and then selects the regions that are most impactful for de-blurring (e.g., regions that are likely to remove unwanted blurring by applying de-blurring). Further, the conventional approach (701) for blur localization fails to recognize partially blurry regions such as candidate region 1 (702) and region 3 (704). Further, the embodiments of the present disclosure reject the candidate Region 4 (705) as this region is relatively sharp.

Figure 8:
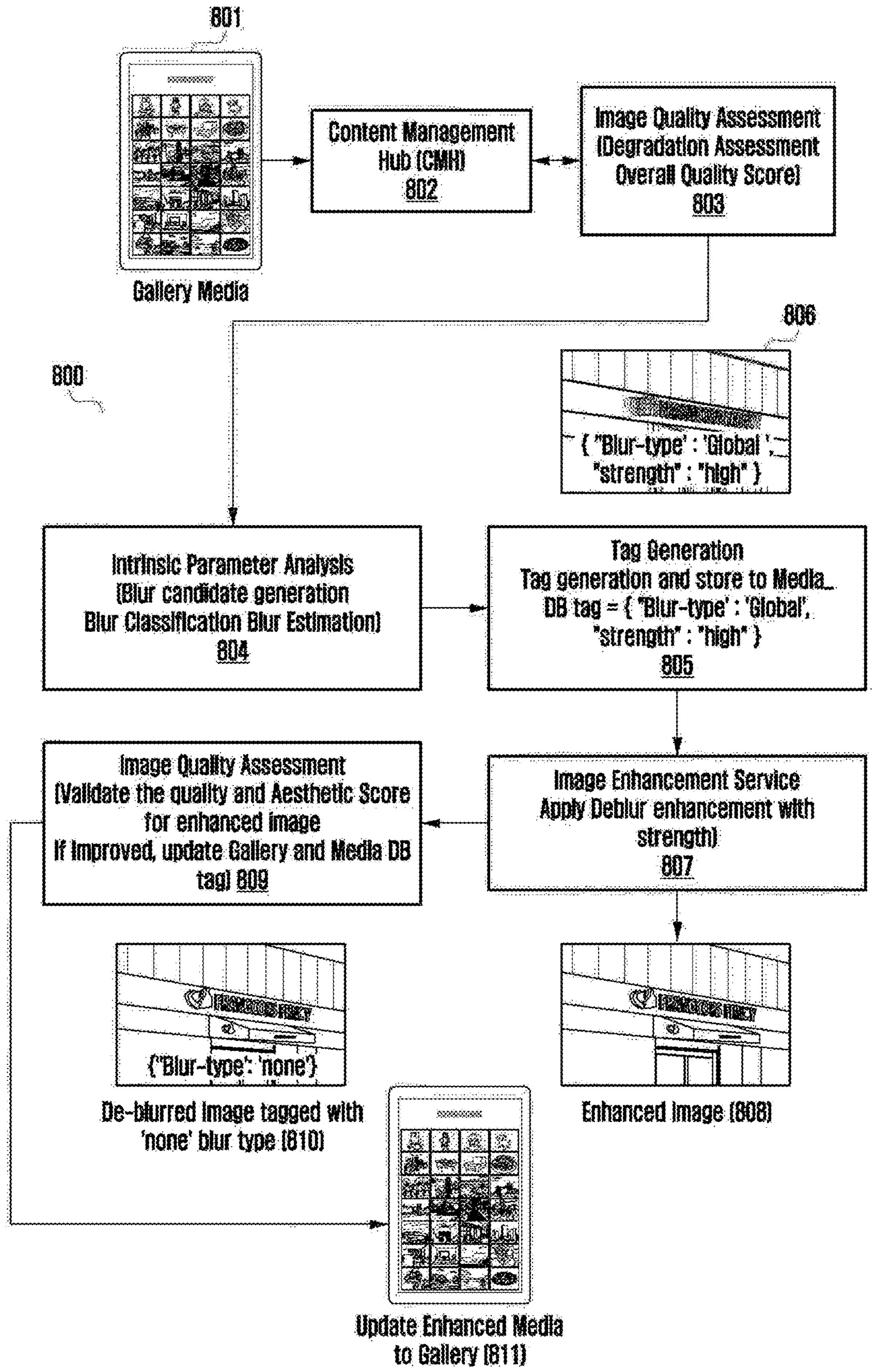
FIG. 8 is a flow chat illustrating a content management hub for image quality assessment and image enhancement service, according to the embodiments as disclosed herein.

FIG. 8 is a flow chart illustrating a content management hub for image quality assessment and image enhancement service, according to the embodiments as disclosed herein.

In one or more examples, the gallery (801) of the electronic device (100) includes a plurality of images. These images are analyzed through a Content Management Hub (CMH) (802) that controls "Image Quality Assessment" (803) and "Image Enhancement Service". The image Quality Assessment (803) includes quality score prediction of media, detecting and estimating degradations in media to improve enhancements. The images are analysed with an intrinsic parameter analysis (804) to perform blur candidate generation, blur classification, and blur estimation.

At 805 and 806, a tag is generated, where the tag may contain information that describes the image quality parameter of the gallery images such as 'Blur-type' and/or 'strength'.

At 807, the Image Enhancement Service is invoked to apply deblur enhancement to produce an enhanced image (808). At 809, image quality assessment is performed to validate the quality and aesthetic score for the enhanced image (808). When the quality is improved, the gallery and media DB and tag are updated and the gallery is updated. The de-blurred image (810) may be tagged with 'none' blur type. At 811, the gallery may be updated with enhanced media.

Figure 9A:
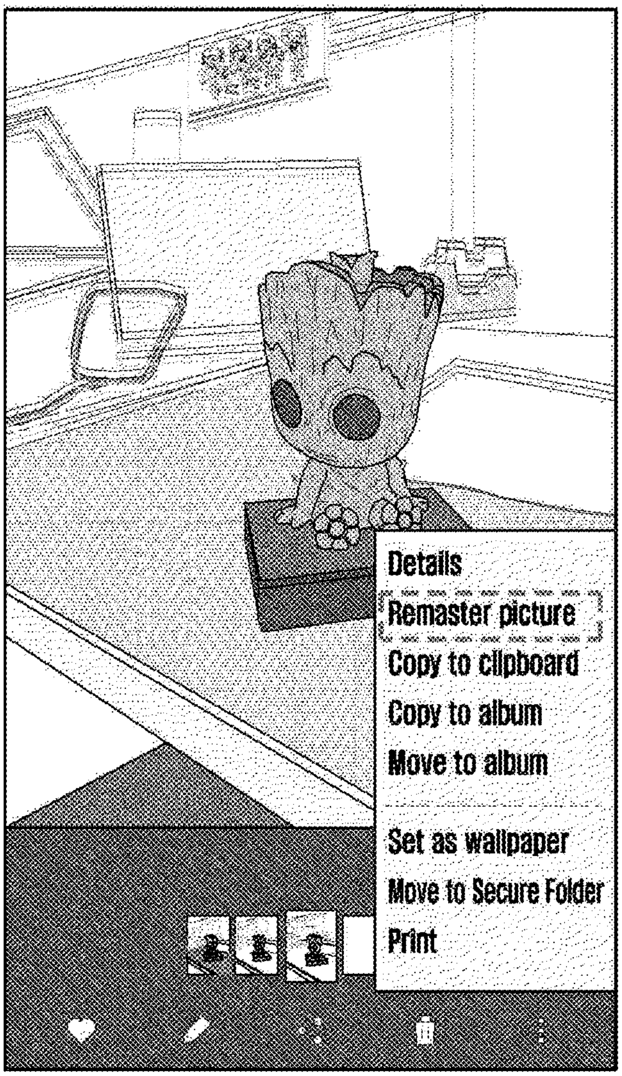
FIGS. 9A-9C are photographic images illustrating a remaster feature in a smartphone, according to the embodiments as disclosed herein.
Figure 9B:
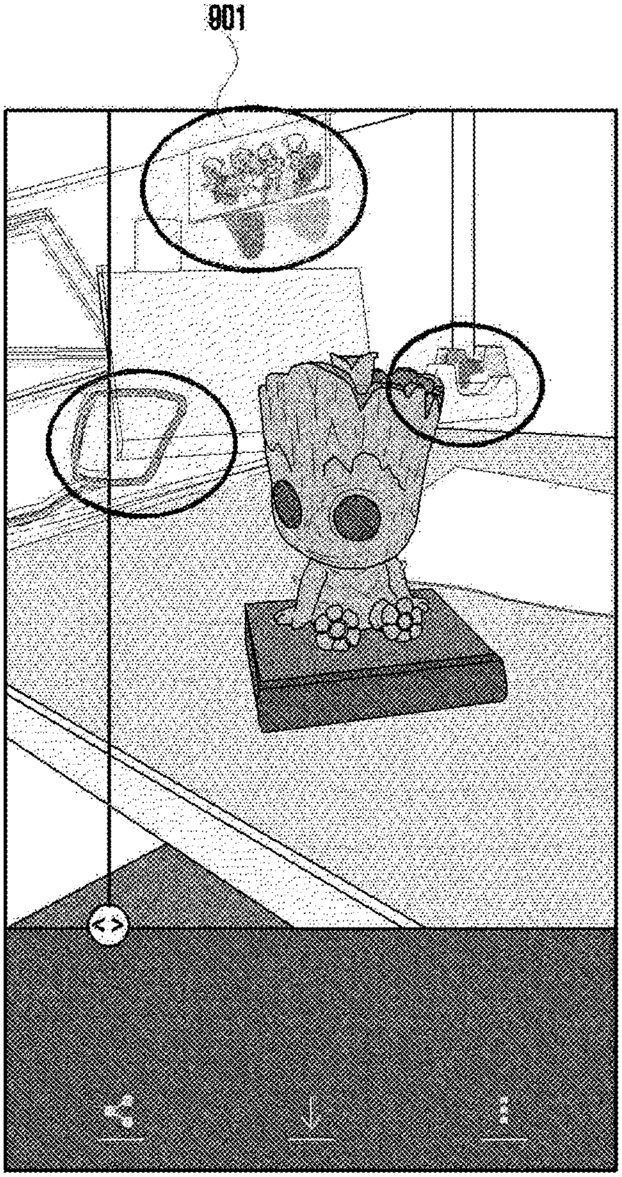
Figure 9C:
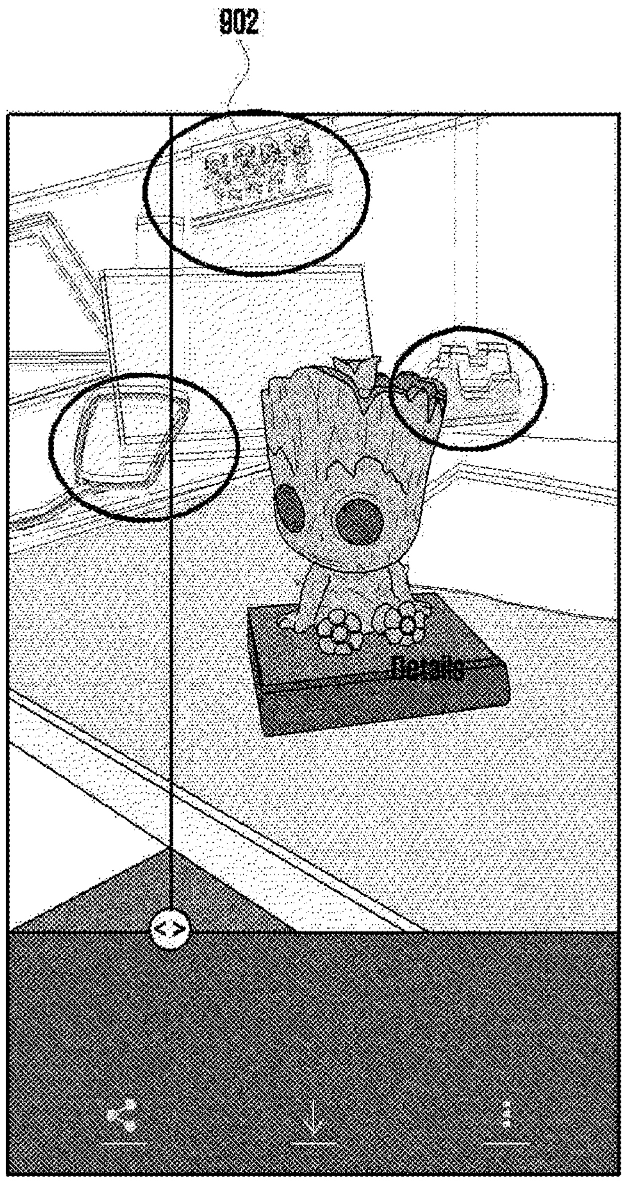

FIG. 9A-9C are photographic images illustrating a remaster feature in the smartphone, according to the embodiments as disclosed herein.

FIG. 9A shows an example of an input image that has intentional blur as it was captured in portrait mode. The input image illustrated in FIG. 9A may be captured when a re-master picture option is selected by the user. In the conventional methods, as shown in FIG. 9B, artifacts (901) are created due to the input image being detected as blur, and consequently running the de-blur. However, in the proposed method, the input image is classified as a sharp image and the background blur is intentional, and therefore, the de-blur is not performed, thereby avoiding artefacts (902) as shown in FIG. 9C.

Figure 10:
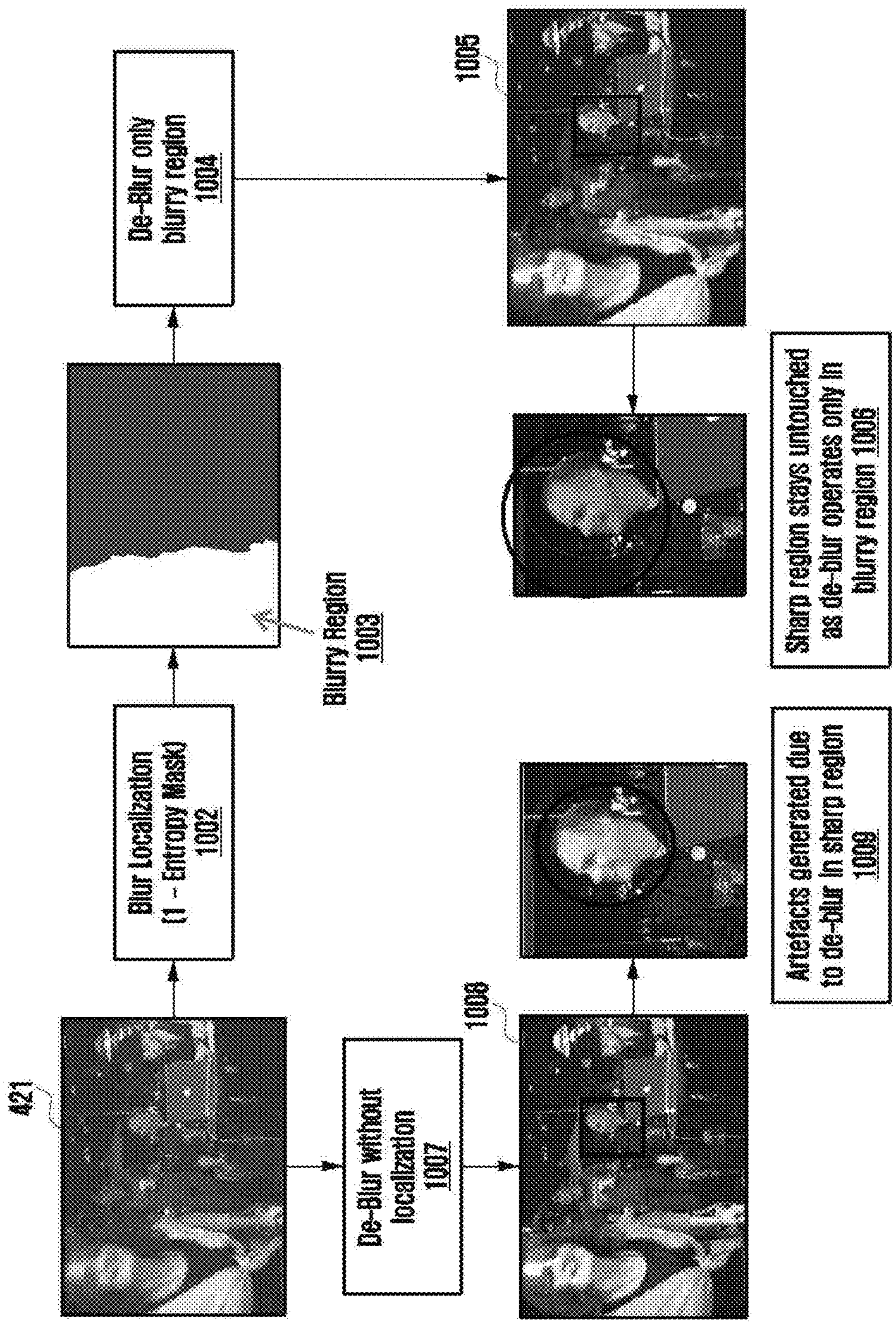
FIG. 10 is a sequence diagram illustrating blur localization for controlled artifact-free de-blur, according to the embodiments as disclosed herein.

FIG. 10 is a sequence diagram illustrating blur localization for controlled artifact-free de-blur, according to the embodiments as disclosed herein.

In the proposed method and electronic device (100), the input image (421) is analyzed through the blur localization (1002) to generate the entropy mask. A blurry region in the generated entropy mask is shown at (1003). At (1004), the embodiments of the present disclosure recommend to deblur only the blurry region (1003). Image (1005) discloses the input image (421) after de-blurring. As shown in 1006, due to the proposed methods and electronic device (100), the sharp region stays untouched as de-blur operates only in blurry region. However in the conventional methods, the de-blur takes places without localization of the blur as indicated at 1007. Thus, at 1008, the input image (421) is de-blurred without localizing the blur. Thus, artifacts are generated due to the de-blur in the sharp regions at 1009.

Figure 11A:
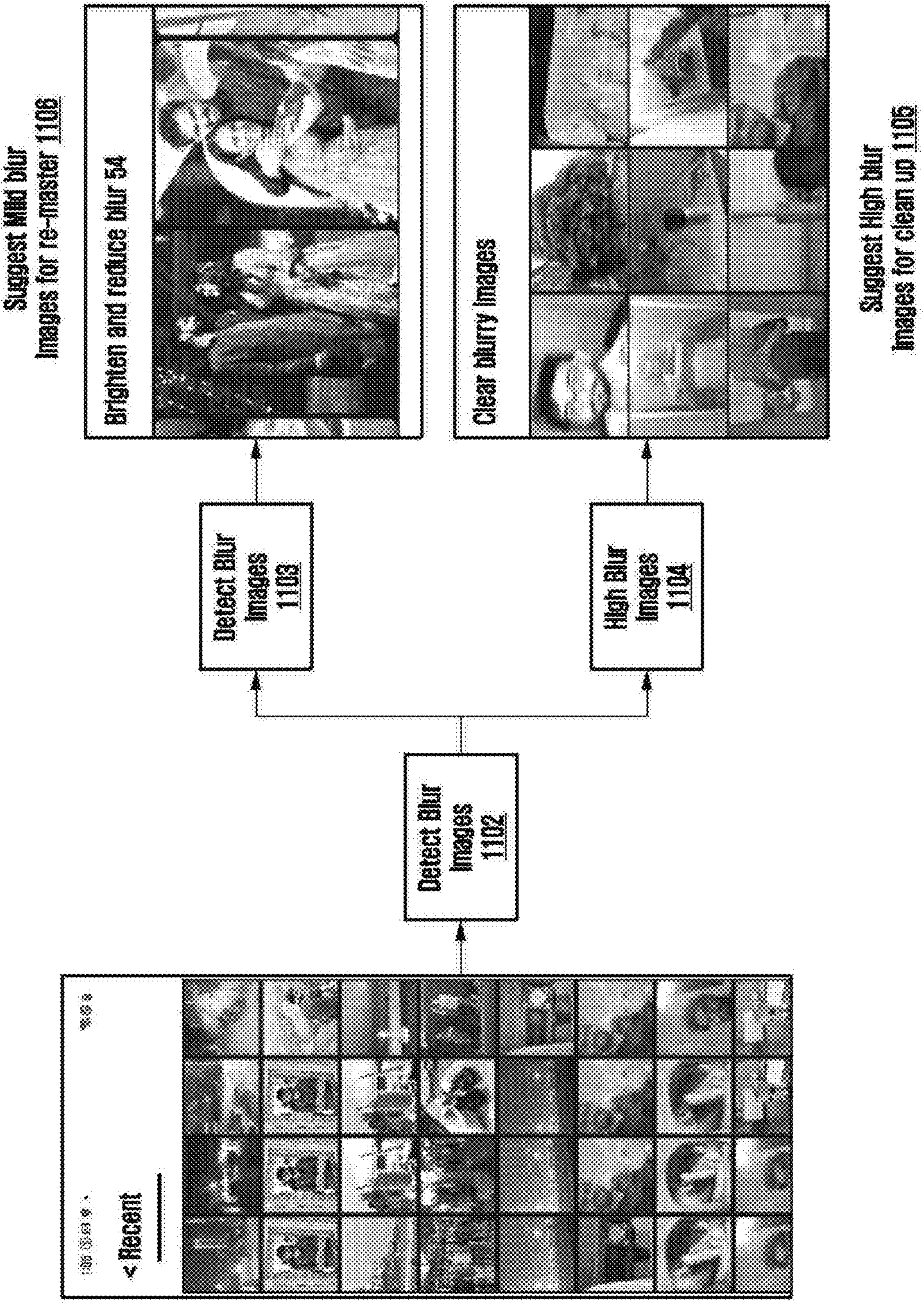
FIG. 11A is a schematic diagram illustrating recognition of high blur images and low blur images in the gallery, and recommends accordingly, according to the embodiments as disclosed herein.

FIG. 11A is a schematic diagram illustrating recognition of high blur images and low blur images in the gallery, and recommends accordingly, according to the embodiments as disclosed herein.

At 1102, the electronic device (100) detects blur images from the gallery. Further, the electronic device (100) classify the detected blur images as mild blur images (1103) and high blur images (1104). Further, the electronic device (100) at 1106 suggest the mild blur images for remaster to de-blur the blur in the mild blur images. The electronic device (100) at (1105) also suggest the high blur images (1104) for clean-up.

Figure 11B:
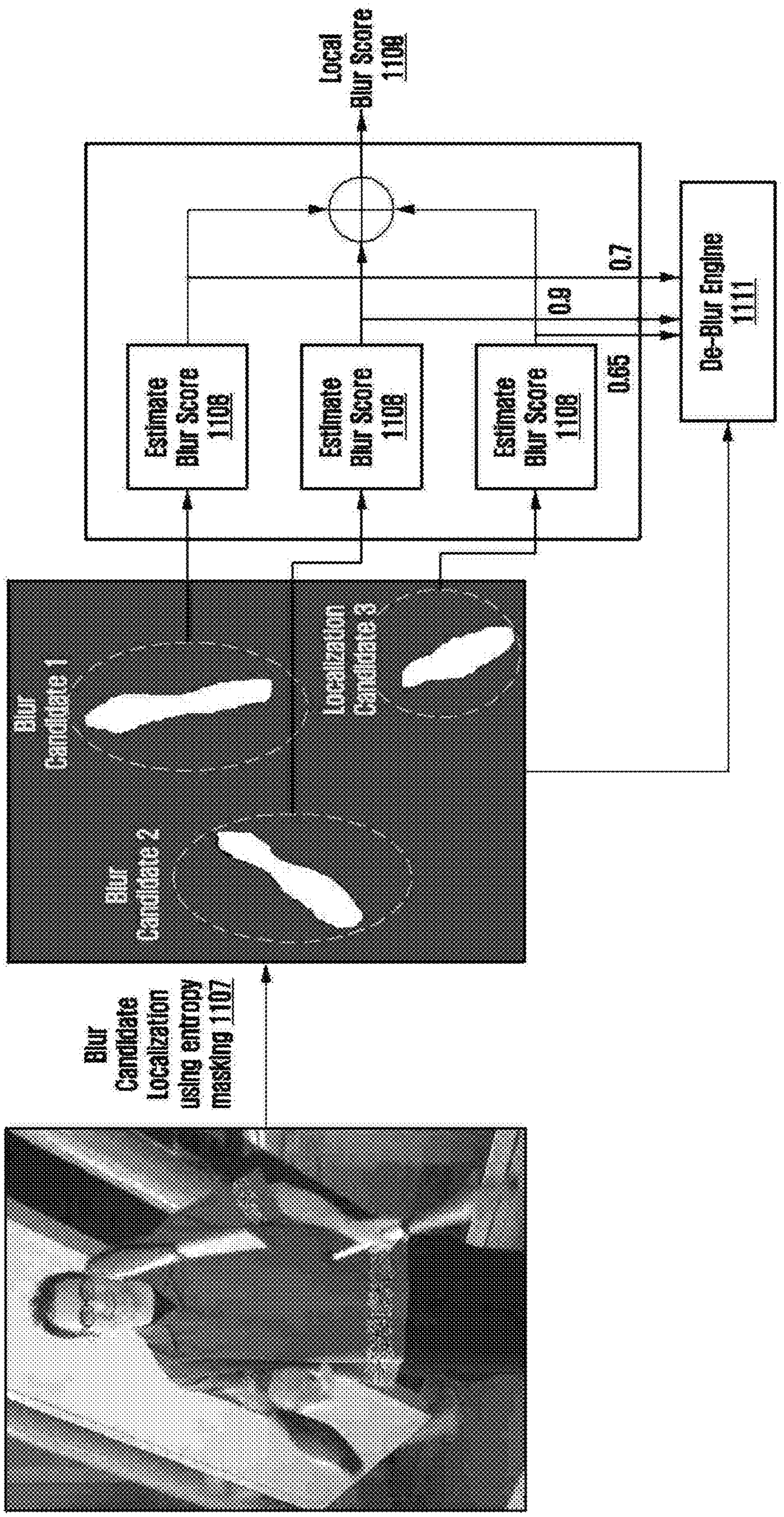
FIG. 11B is a schematic diagram illustrating the working of a de-blur engine, according to the embodiments as disclosed herein.

FIG. 11B is a schematic diagram illustrating the working of the de-blur engine, according to the embodiments as disclosed herein.

At 1107, the Blur Candidate Localization takes places for the input image using entropy masking to generate the blur candidates (blur candidate 1, blur candidate 2 and blur candidate 3 as shown in the FIG. 11B). The blur candidates may be analyzed to provide the estimate blur score at 1108. The local blur score is generated at 1109 based on fusing the estimate blur score of the blur candidates. The estimate blur score of the blur candidates (0.65, 0.9 and 0.7) are given to the de-blur engine (1111). The de-blur engine (1111) may apply stronger de-blurring on blur candidate 2 as compared to others since blur candidate 2 has highest blur.

Figure 12:
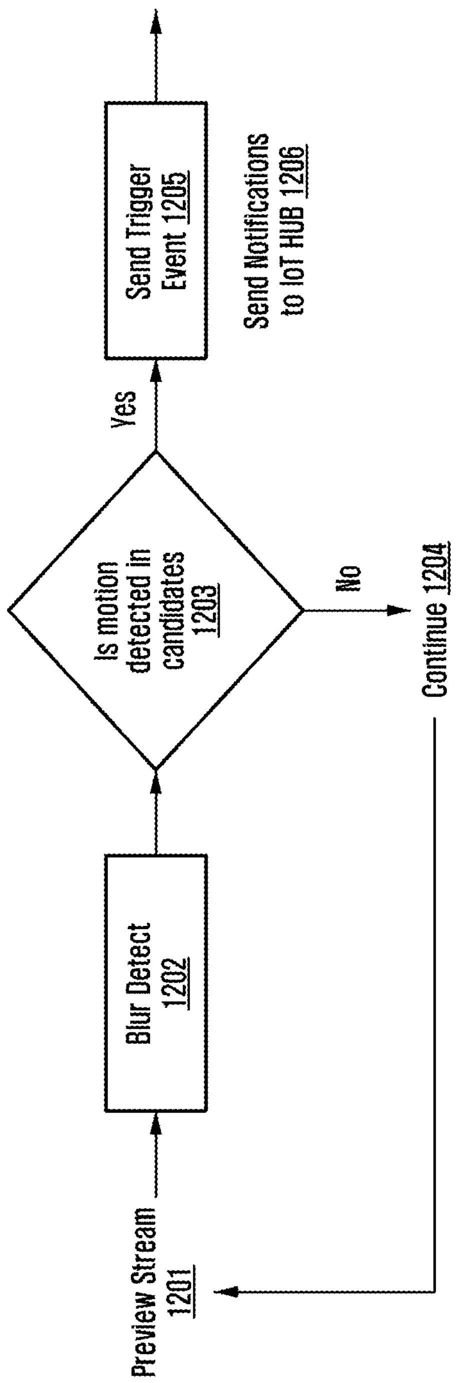
FIG. 12 is a schematic diagram illustrating identifying subtle motion in IoT applications or surveillance, according to the embodiments as disclosed herein.

FIG. 12 is a schematic diagram illustrating identifying subtle motion in IOT applications or surveillance, according to the embodiments as disclosed herein.

A preview stream (1201) of the IOT applications or the surveillance is monitored through the proposed method and electronic device (100) to determine blur at 1202. At 1203, the electronic device (100) detects whether motion is detected in the candidates. At 1205, the electronic device (100) sends trigger event/notification to IoT hub when the motion is detected in the candidates. At 1204, the electronic device (100) continue to monitor the preview stream when the motion is not detected in the candidates.

Further, the proposed method and electronic device (100) identify potential movement candidates for motion which is of interest to the particular IoT device. The potential movement identification is useful, for example, for a baby monitor, smart home controller, a security surveillance feed, etc. Thus, on detection of motion of interest (including small motion), appropriate notification and alarms can be triggered.

Figure 13:
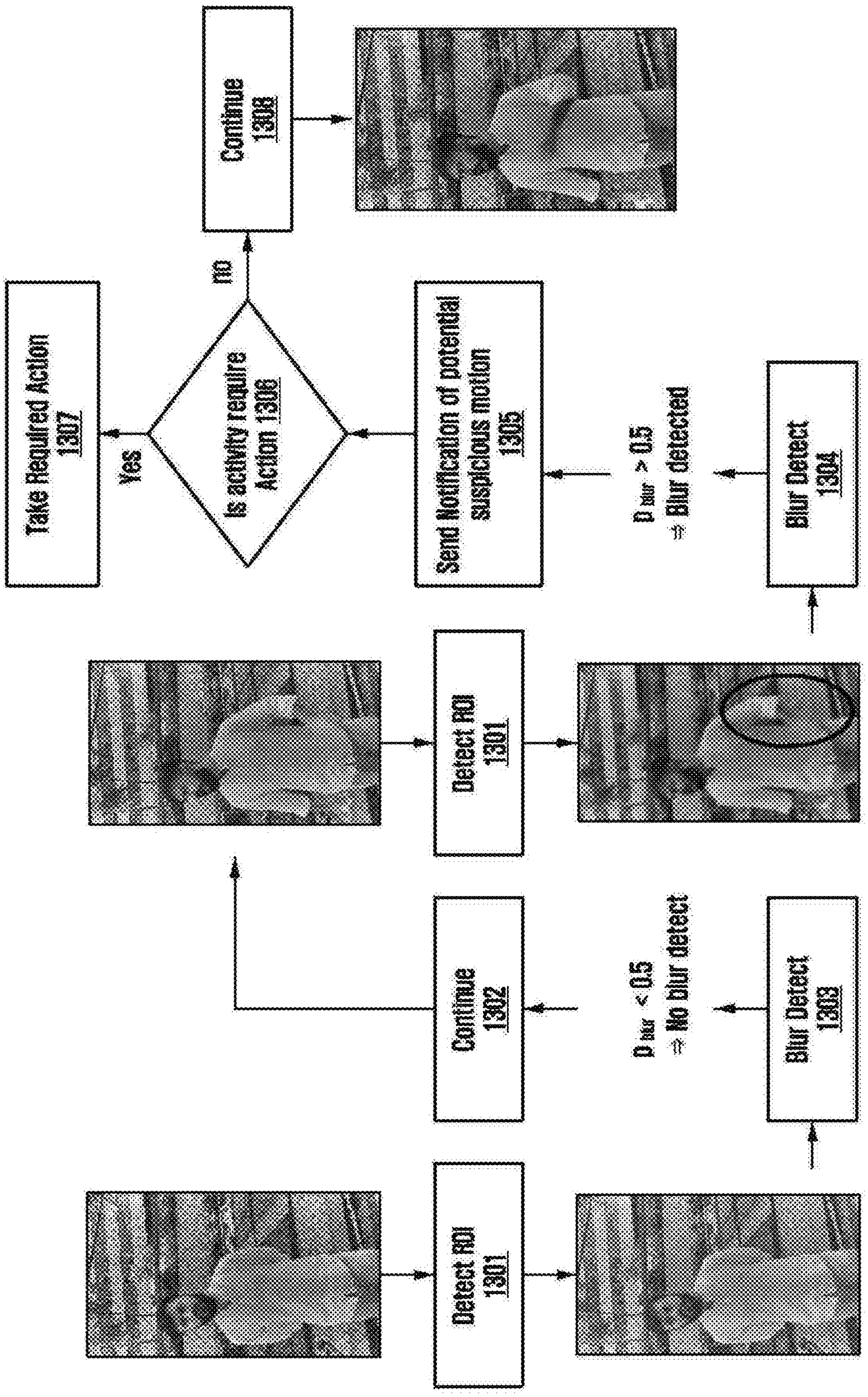
FIG. 13 is a sequence diagram illustrating identifying the subtle motion in the IoT applications or surveillance, according to the embodiments as disclosed herein.

FIG. 13 is a sequence diagram illustrating identifying the subtle motion in the IOT applications or surveillance, according to the embodiments as disclosed herein.

At 1301, the electronic device (100) detects Region of Interest (ROI) of the preview stream. At 1303, the electronic device (100) detects blur by comparing the probability of blur of the input image from the preview stream with a threshold.

When the probability of blur is lesser than the threshold, for example 0.5, then the electronic device continues (1302) to capture next image. The blur and motion is detected, at 1304, in the input image, when the probability of blur is greater than the threshold, for example 0.5. At 1305, the electronic device (100) sends a notification of potential suspicious motion. Further, the electronic device (100) at 1306 determines whether the detected motion requires action. At 1307, the electronic device (100) take required action when the detected motion requires action. At 1308, the electronic device (100) does not take required action when the detected motion does not requires the action.

Figure 14:
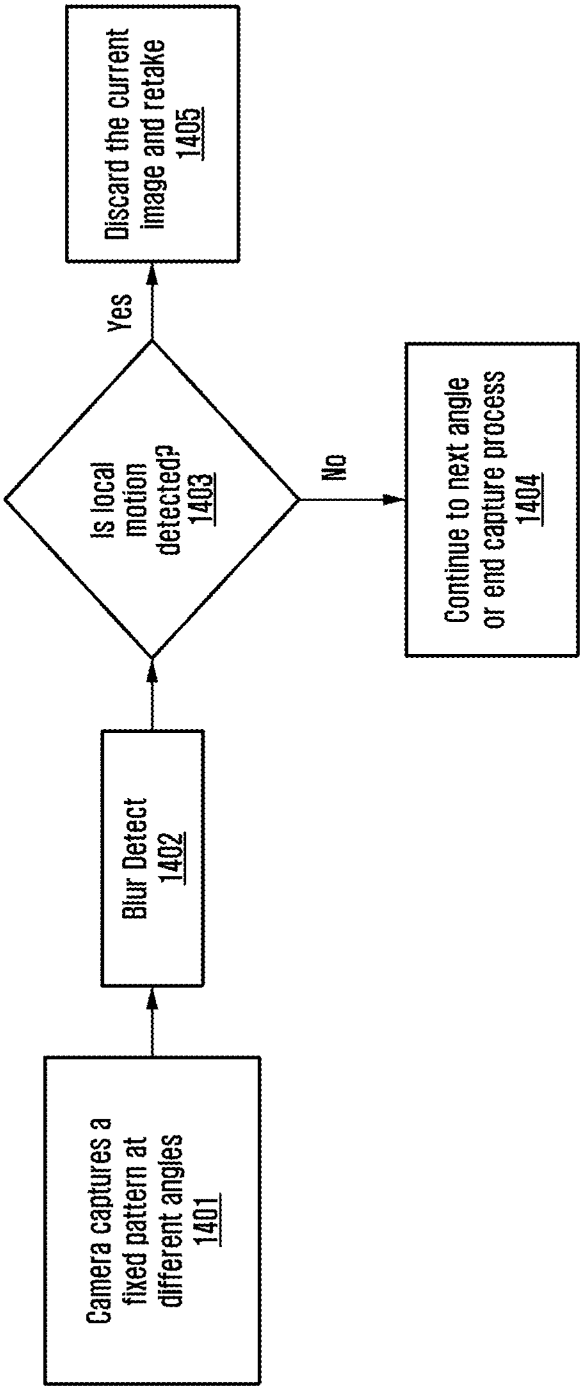
FIG. 14 is a schematic diagram illustrating a aiding of automatic capture for factory camera calibration, according to the embodiments as disclosed herein.

FIG. 14 is a schematic diagram illustrating an aiding of automatic capture for factory camera calibration, according to the embodiments as disclosed herein.

At 1401, the camera captures a fixed pattern at different angles. At 1402, the electronic device (100) detects blur in the captured input image. At 1403, the electronic device (100) determines whether local motion is detected. At 1404, the electronic device (100) continue to capture next angle or end the capturing when the local motion is not detected. At 1405, the electronic device (100) discards the captured input image and retake the image when local motion is detected.

The proposed method and electronic device (100) identifying blurry images in automated capture scenarios like factory camera calibration. Where accurate fast local/global blur detection can be used to discard and recapture images that are blurry. Since blurry images can lead to inaccurate calibration parameters that cannot be used for processes such as factory camera calibration.

Figure 15:
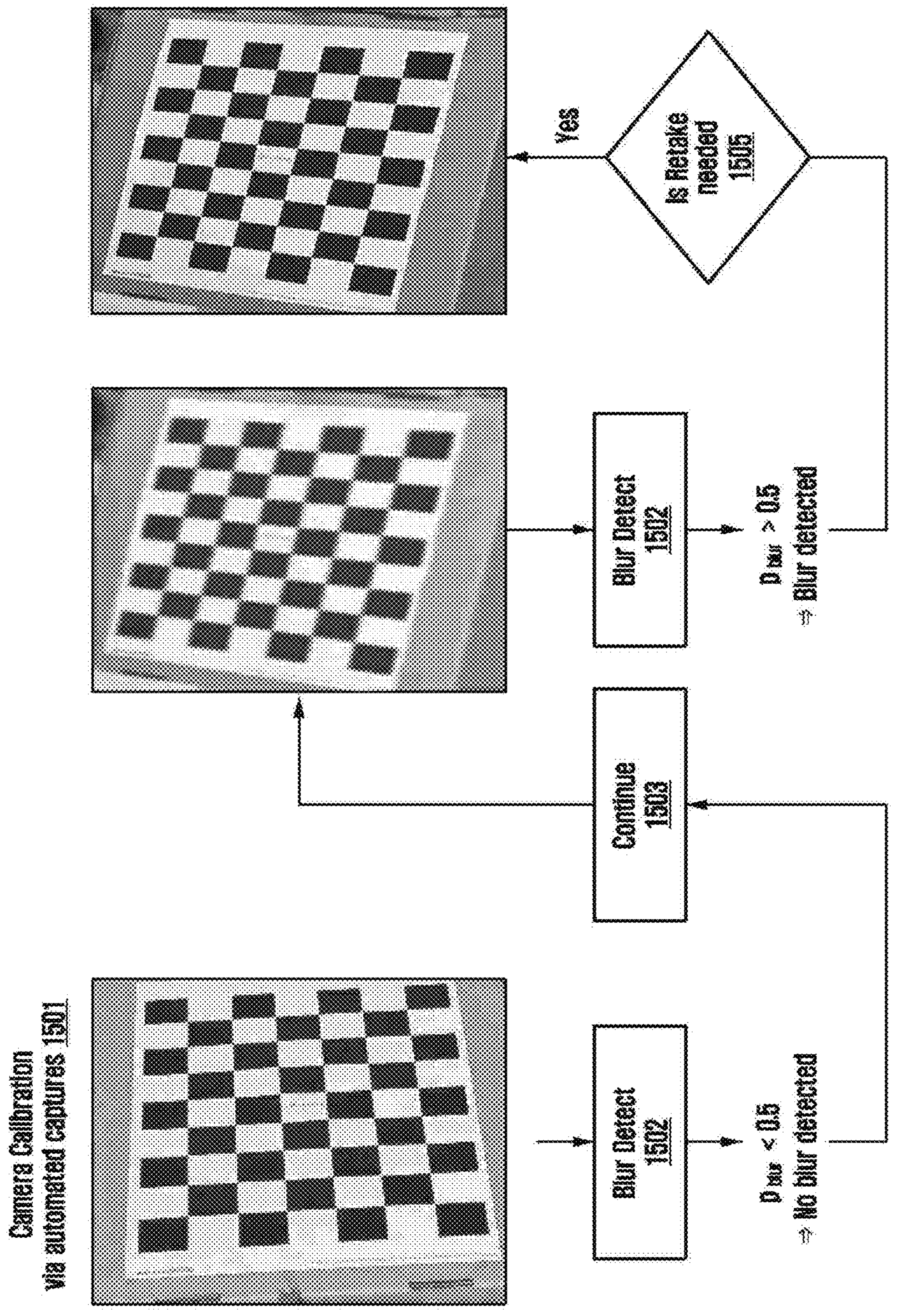
FIG. 15 is a sequence diagram illustrating the aiding of the automatic capture for the factory camera calibration, according to the embodiments as disclosed herein.

FIG. 15 is a sequence diagram illustrating the aiding of the automatic capture for the factory camera calibration, according to the embodiments as disclosed herein.

At 1501, the electronic device (100) performs automated capture scenarios like factory camera calibration. At 1502, the electronic device (100) determines whether blur is detected in the input image during camera calibration. The electronic device (100) determines whether probability of blur is lesser than the threshold. At 1503, the electronic device (100) continues to capture the images when the probability of blur is lesser than the threshold. At 1505, the electronic device (100) determines whether retake is needed when the probability of blur is not lesser than the threshold and performs retake when the retake is needed.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within scope of the embodiments as described herein.

What is claimed is:

1. A method of detecting blur in an input image, the method performed by at least one processor of an electronic device, the method comprising:

detecting, by the electronic device performing a pixel analysis on the input image, one or more candidate blur regions of a plurality of regions in the input image;

determining, by the electronic device, a first confidence score of the one or more candidate blur regions in the input image;

determining, by the electronic device, a second confidence score of a global blur in the input image;

determining, by the electronic device, a third confidence score of an intentional blur in the input image; and detecting, by the electronic device, a type of blur and a strength of the type of blur in the input image based on the first confidence score of the one or more candidate blur regions, the second confidence score of the global blur, and the third confidence score of the intentional blur.

2. The method as claimed in claim 1, wherein the detecting, by the electronic device, the one or more candidate blur regions in the input image, comprises:

measuring, by the electronic device, a plurality of entropies of the plurality of regions in the input image; and classifying, by the electronic device, a first set of regions of the plurality of regions with entropies lower than a first threshold as sharp, a second set of regions of the plurality of regions with entropies higher than a second threshold as blur, and a third set of regions of the plurality of regions with entropies higher than the first threshold and lower than the second threshold as the one or more candidate blur regions, wherein the second threshold is higher than the first threshold.

3. The method as claimed in claim 1, wherein the determining, by the electronic device, the third confidence score of the intentional blur in the input image, comprises:

measuring, by the electronic device, a plurality of entropies of the plurality of regions in the input image; and determining, by the electronic device, the third confidence score of the intentional blur to be categorized as a high level based on a determination that (i) a value of each entropy from the plurality of entropies is lower than an entropy threshold towards a center of the input image and the value of each entropy from the plurality of entropies is higher than the entropy threshold towards edges of the input image.

4. The method as claimed in claim 1, wherein the determining, by the electronic device, the first confidence score of the one or more candidate blur regions in the input image, comprises:

generating, by the electronic device, a segmented image indicating the one or more candidate blur regions by fusing a candidate blur region mask with the input image, wherein the candidate blur region mask indicates a plurality of entropies of the plurality of regions in the input image; and determining, by the electronic device, the first confidence score of each of the one or more candidate blur regions in the segmented image.

5. The method as claimed in claim 1, wherein the determining, by the electronic device, the second confidence score of the global blur in the input image, comprises:

analyzing, by the electronic device, an entirety of the input image; and determining, by the electronic device, the second confidence score of the global blur in the input image based on a level of intensity of the global blur in the input image.

6. The method as claimed in claim 1, wherein the detecting, by the electronic device, the type of blur and the strength of the type of blur in the input image using the first confidence score of the one or more candidate blur regions, the second confidence score of the global blur, and the third confidence score of the intentional blur, comprises:

determining, by the electronic device, a first weight for the first confidence score of the one or more candidate blur regions based on a percentage of pixels associated with the one or more candidate blur regions, a second weight for the second confidence score of the global blur based on a percentage of pixels associated with global blur regions, and a third weight for the third confidence score of the intentional blur based on a percentage of pixels associated with intentional blur regions; and detecting the type of blur and the strength of the type of blur in the input image using the first weight, the second weight, the third weight, the first confidence score of the one or more candidate blur regions, the second confidence score of the global blur, and the third confidence score of the intentional blur.

7. The method as claimed in claim 1, further comprising:

determining, by the electronic device, that the type of blur and the strength of the type of blur is greater than or equal to a blur threshold; and performing, by the electronic device, at least one of:

displaying a recommendation on the electronic device, wherein the recommendation is related to at least one of deletion of the input image, an enhancement of the input image, de-blurring the input image, and recapturing the input image, and generating a tag comprising an image quality parameter comprising at least one of the type of blur and the strength of the type of blur, and storing the tag associated with the input image in a media database.

8. A blur correction management method for an input image, the method performed by at least on processor of an electronic device, the method comprising:

detecting, by the electronic device by performing a pixel analysis on the input image, a global blur in the input image for which blur correction is required;

estimating, by the electronic device, a global blur probability as a measure of a first confidence level associated with the global blur;

detecting, by the electronic device, one or more local regions having candidate blur in the input image;

measuring, by the electronic device, one or more entropies in the detected one or more local regions having the candidate blur;

selecting, by the electronic device based on the one or more entropies, one or more regions of the one or more local regions having a pre-defined entropy range for local blur correction;

estimating, by the electronic device, a local blur probability as a measure of a second confidence level associated with the local blur;

detecting, by the electronic device based on the one or more entropies, one or more sharp regions comprising a pre-defined entropy range;

estimating, by the electronic device, an intentional blur probability as a measure of a third confidence level associated with a blur intentionally introduced; and fusing, by the electronic device, the global blur probability, the local blur probability, and the intentional blur probability to generate a determination on correcting the global blur and/or the local blur.

9. An electronic device for of detecting blur in an input image, the electronic device comprising:

a memory storing one or more instructions; and a processor operatively coupled to the memory wherein the one or more instructions, when executed by the processor, cause the electronic device to:

detect, by the electronic device performing a pixel analysis on the input image, one or more candidate blur regions of a plurality of regions in the input image, determine a first confidence score of the one or more candidate blur regions in the input image, determine a second confidence score of a global blur in the input image, determine a third confidence score of an intentional blur in the input image, and detect a type of blur and a strength of the type of blur in the input image based on the first confidence score of the one or more candidate blur regions, the second confidence score of the global blur, and the third confidence score of the intentional blur.

10. The electronic device as claimed in claim 9, wherein the one or more instructions, when executed by the processor, further cause the electronic device, to detect the one or more candidate blur regions in the input image, to:

measure a plurality of entropies of the plurality of regions in the input image, classify a first set of regions of the plurality of regions with entropies lower than a first threshold as sharp, a second set of regions of the plurality of regions with entropies higher than a second threshold as blur, and a third set of regions of the plurality of regions with entropies higher than the first threshold and lower than the second threshold as the one or more candidate blur regions, and wherein the second threshold is higher than the first threshold.

11. The electronic device as claimed in claim 9, wherein the one or more instructions, when executed by the processor, further cause the electronic device, to determine the third confidence score of the intentional blur in the input image, to:

measure a plurality of entropies of the plurality of regions in the input image; and determine the third confidence score of the intentional blur to be categorized as a high level based on a determination that (i) a value of each entropy from the plurality of entropies is lower than an entropy threshold towards a center of the input image and the value of each entropy from the plurality of entropies is higher than the entropy threshold towards edges of the input image.

12. The electronic device as claimed in claim 9, wherein the one or more instructions, when executed by the processor, further cause the electronic device, to determine the first confidence score of the one or more candidate blur regions in the input image, to:

generate a segmented image indicating the one or more candidate blur regions by fusing a candidate blur region mask with the input image, wherein the candidate blur region mask indicates a plurality of entropies of the plurality of regions in the input image; and determine the first confidence score of each of the one or more candidate blur regions in the segmented image.

13. The electronic device as claimed in claim 9, wherein the one or more instructions, when executed by the processor, further cause the electronic device, to determine the second confidence score of the global blur in the input image, to:

analyze an entirety of the input image; and determine the second confidence score of the global blur in the input image based on a level of intensity of the global blur in the input image.

14. The electronic device as claimed in claim 9, wherein the one or more instructions, when executed by the processor, further cause the electronic device, to detect the type of blur and the strength of the type of blur in the input image using the first confidence score of the one or more candidate blur regions, the second confidence score of the global blur, and the third confidence score of the intentional blur, to:

determine a first weight for the first confidence score of the one or more candidate blur regions based on a percentage of pixels associated with the one or more candidate blur regions, a second weight for the second confidence score of the global blur based on a percentage of pixels associated with global blur regions, and a third weight for the third confidence score of the intentional blur based on a percentage of pixels associated with intentional blur regions, and detect the type of blur and the strength of the type of blur in the input image using the first weight, the second weight, the third weight, the first confidence score of the one or more candidate blur regions, the second confidence score of the global blur, and the third confidence score of the intentional blur.

15. The electronic device as claimed in claim 9, wherein the one or more instructions, when executed by the processor, further cause the electronic device, to:

determine that the type of blur and the strength of the type of blur is greater than or equal to a blur threshold, and perform at least one of:

display a recommendation on the electronic device, wherein the recommendation is related to at least one of deletion of the input image, an enhancement of the input image, de-blurring the input image, and recapturing the input image, and generate a tag comprising an image quality parameter comprising at least one of the type of blur and the strength of the type of blur, and storing the tag associated with the input image in a media database.

* * * * *